(12) United States Patent
Suzuki et al.

(10) Patent No.: US 6,741,543 B1
(45) Date of Patent: May 25, 2004

(54) LENS DRIVING APPARATUS

(75) Inventors: Jun Suzuki, Tokorozawa (JP); Katsumi Ishii, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/685,600

(22) Filed: Oct. 11, 2000

(30) Foreign Application Priority Data

Oct. 15, 1999 (JP) .......................................... 11-293251
Oct. 25, 1999 (JP) .......................................... 11-302343

(51) Int. Cl.$^7$ ............................................. G11B 17/00
(52) U.S. Cl. ...................................................... 369/244
(58) Field of Search ............................ 369/244, 44.14, 369/44.15, 44.22; 359/819, 823, 824

(56) References Cited

U.S. PATENT DOCUMENTS

| | | | |
|---|---|---|---|
| 5,442,606 A | 8/1995 | McCaslin et al. | 369/44.15 |
| 5,663,840 A | 9/1997 | Matsui | 359/814 |
| 5,768,037 A | 6/1998 | Marino et al. | 359/824 |
| 5,844,881 A | * 12/1998 | Kasuga et al. | 359/824 |
| 5,986,983 A | * 11/1999 | Simpson et al. | 369/44.14 |

FOREIGN PATENT DOCUMENTS

JP          8-203103          8/1996

\* cited by examiner

Primary Examiner—George J. Letscher
Assistant Examiner—Mark Blouin
(74) Attorney, Agent, or Firm—Morgan, Lewis & Bockius LLP

(57) ABSTRACT

A lens driving apparatus is disclosed which enables to make effective use of the magnetic flux of magnets and provide the coil board reduced in size. A pair of L-shaped yokes to which fixed are a V-shaped magnet and an inverted V-shaped magnet for producing a magnetic field are fixed with a plurality of screws on a plate-form actuator base, arranged opposite to each other and spaced apart by a predetermined magnetic gap. A movable portion, which is supported with four support wires of a support base fixed with a screw to the actuator base, is disposed in the magnetic gap defined by the V-shaped magnet and the inverted V-shaped magnet. Fixed to the movable portion are a V-shaped drive coil comprising focus and tracking drive coils provided on the side of a lens holder in the direction of jitter, and an inverted V-shaped drive coil or the V-shaped drive coil 80 that is rotated by 180 degrees. According to another aspect of the present invention, a V-shaped drive coil and an inverted V-shaped drive coil or the V-shaped drive coil that is rotated by 180 degrees are fixed to the movable portion. The V-shaped drive coil comprises drive coils A and B provided on the side of a lens holder in the direction of jitter. The movable portion, which is supported with four support wires of the support base fixed with the screw to the actuator base, is also disposed in the magnetic gap defined by the V-shaped magnet and the inverted V-shaped magnet.

28 Claims, 28 Drawing Sheets

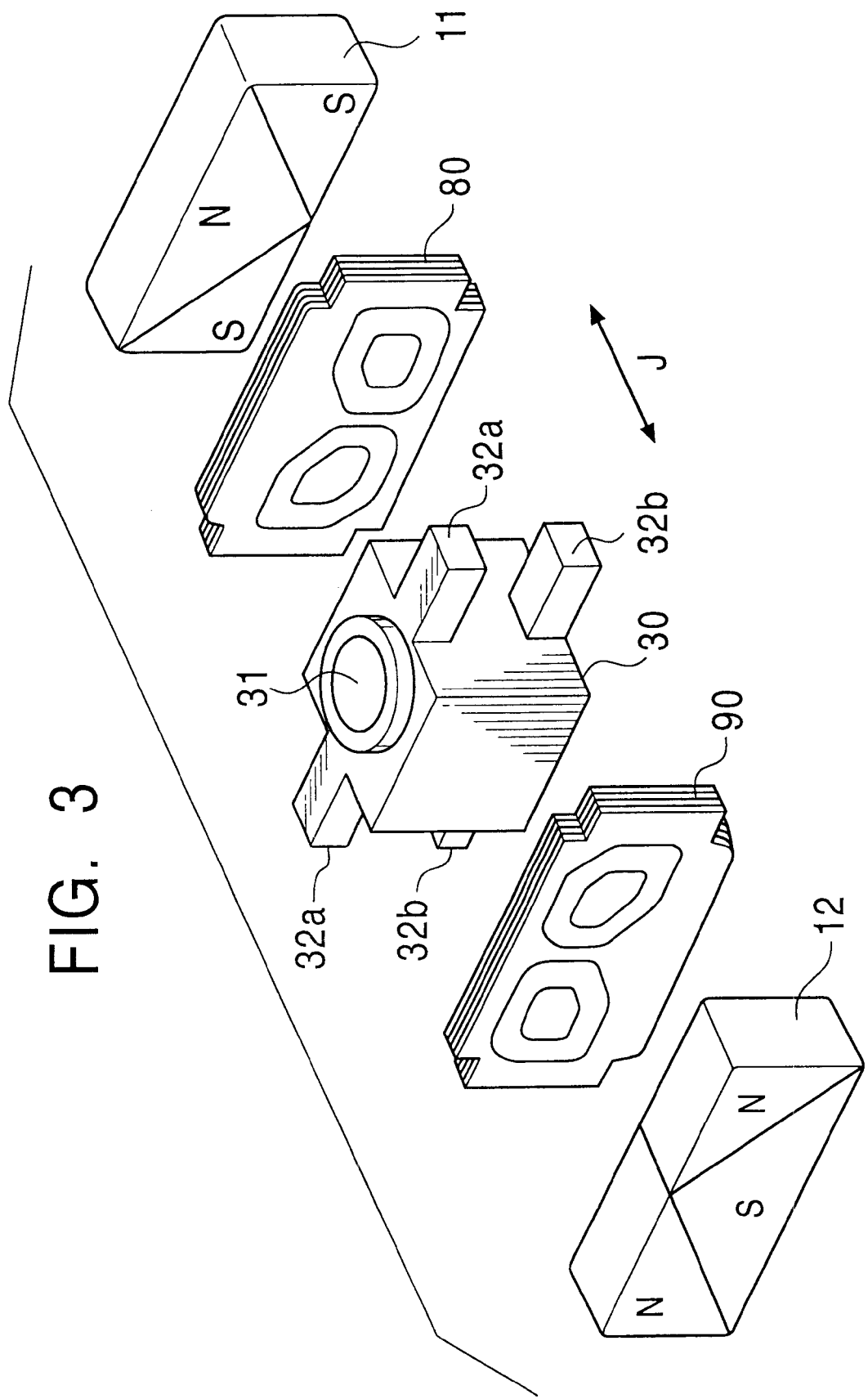

FIG. 19A
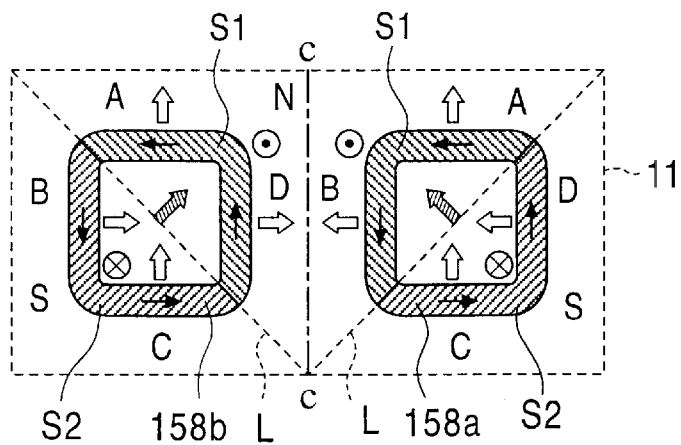
FIG. 19B  FIG. 19C  FIG. 19D
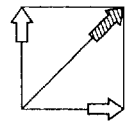 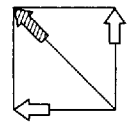 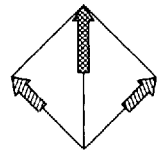
FIG. 19E
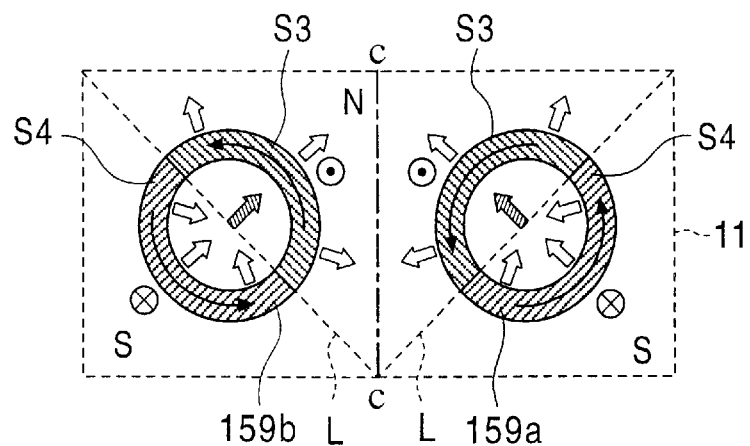

A DRIVING FORCE

B DRIVING FORCE

TOTAL DRIVING FORCE Cd

LENS DRIVING APPARATUS

BACKGROUND OF THE INVENTION

1. Field of the Invention

The present invention relates to a lens drive apparatus for use in a disc player for writing information onto discs and reading recorded information, and more particularly to the configuration of a lens driving apparatus employing plane coils.

2. Description of Related Art

There is a known lens driving apparatus that drives an objective lens in the direction of the optical axis (in the direction of focus) to condense onto the surface of a disc a beam for reading information that has been optically recorded thereon. The lens driving apparatus also drives the objective lens in a direction perpendicular to the optical axis of the lens to allow the read beam to follow information tracks.

It is desirable that movable portions constituting the lens driving apparatus are small in size and light in weight. As shown in FIG. 1A, available was a coil bobbin type 5 in which focus coils 3 and tracking coils 4 are wound on a coil bobbin 2 having an objective lens 1 built therein. A print coil type 8 as shown in FIG. 1B has been suggested (for example, in Japanese Patent Laid-Open Publication No.Hei 8-203103) in place of the coil bobbin type 5. The print coil type 8 has flat coil boards 7 fixed with adhesive or the like to both sides of a holder 6 having the objective lens 1 built therein, the coil boards 7 being prepared by patterning and etching the focus coils 3 and the tracking coils 4.

However, with the coil boards 7 suggested in Japanese Patent Kokai No. 8-203103, the focus coils 3 are provided with a drive force in the direction of focus (shown by arrow F) by being arranged across the N- and S-poles of a magnet 9, as shown in FIG. 1C. Two tracking coils 4 are located on the N-pole of the magnet 9 and the other two tracking coils 4 are located on the S-pole of the magnet 9. In addition, about only a quarter of each of the tracking coils 4 is placed within the magnetic field of the magnet 9 (in the direction shown by arrow T in the figure of tracking). Thus, the tracking coils 4 formed in four are provided with a drive force in the tracking direction. Accordingly, the coil boards 7 of the print coil type 8 needed to be adapted to substantially extend sideward from the outer dimensions of the magnet 9 in the tracking direction. In addition, the effective magnetic field of the magnet 9 for the tracking coils 4 was reduced and the coil boards 7 were made larger than the outer dimensions of the magnet 9.

OBJECTS AND SUMMARY OF THE INVENTION

The present invention has been developed in view of the aforementioned problems. An object of the present invention is to provide a lens driving apparatus that effectively makes use of the magnetic flux of a magnet and can provide coil boards reduced in size.

Another object of the present invention is to provide a lens driving apparatus that has a reduced number of coils, thereby providing coil boards reduced in size and cost.

To solve the aforementioned problems, a lens driving apparatus according to a first aspect of the present invention comprises a lens holder supported movably in directions of focus and tracking, and focus and tracking drive coils, mounted to the lens holder. The device also comprises magnetic flux imparting means for imparting a magnetic flux to the focus and tracking drive coils. The lens driving apparatus is characterized in that the focus and tracking drive coils each include a pair of plane coils, formed in planes perpendicular to a direction of jitter and having a coil axis parallel to the direction of jitter substantially perpendicular to the directions of focus and tracking. The lens driving apparatus is also characterized in that the magnetic flux imparting means impart magnetic fluxes in directions opposite to each other along the direction of jitter to two areas of the plane coils divided by imaginary lines inclined relative to the directions of both focus and tracking. The lens driving apparatus is further characterized in that the imaginary lines of the pair of plane coils each are arranged symmetrically with respect to a plane parallel to the direction of jitter and including an optical axis.

In addition, a lens driving apparatus according to a second aspect of the present invention is the aforementioned lens driving apparatus, characterized in that the magnetic flux imparting means include magnets opposite to the plane coils, the magnets having different magnetic poles opposite to each of the two areas.

Furthermore, a lens driving apparatus according to a third aspect of the present invention is the lens driving apparatus according to the first feature. The lens driving apparatus is characterized in that the magnetic flux imparting means are arranged opposite to the plane coils and include magnets having magnetic pole surfaces perpendicular to the direction of jitter, and the magnetic pole surfaces have different magnetic poles sitting on areas bounded by the imaginary lines.

Furthermore, a lens driving apparatus according to a fourth aspect of the present invention is any one of the aforementioned lens driving apparatuss. The lens driving apparatus is characterized in that the pair of plane coils constituting the focus drive coil each are supplied with drive currents in the same direction. On the other hand, the pair of plane coils constituting the tracking drive coil each are supplied with drive currents in directions opposite to each other.

Furthermore, a lens driving apparatus according to a fifth aspect of the present invention is any one of the aforementioned lens driving apparatuss according to the first to third aspect of the present invention. The lens driving apparatus is characterized in that the pair of plane coils constituting the focus drive coil each are supplied with drive currents in directions opposite to each other. On the other hand, the pair of plane coils constituting the tracking drive coil each are supplied with drive currents in the same direction.

Furthermore, a lens driving apparatus according to a sixth aspect of the present invention is any one of the aforementioned lens driving apparatuss. The lens driving apparatus is characterized in that the pair of plane coils constituting the focus drive coil and the pair of plane coils constituting the tracking drive coil are formed in the same in-plane shape, being arranged one on the other along the direction of jitter.

Furthermore, a lens driving apparatus according to a seventh aspect of the present invention is any one of the aforementioned lens driving apparatuss. The lens driving apparatus is characterized in that the pair of plane coils constituting the focus drive coil each generate drive forces to yield a resultant focus drive force. On the other hand, the pair of plane coils constituting the tracking drive coil each generate drive forces to yield a resultant tracking drive force.

Furthermore, a lens driving apparatus according to an eighth aspect of the present invention comprises a lens holder having a bearing hole to be fitted to a shaft extending in a direction of focus, made slidable along and rotatable about the shaft. The lens driving apparatus also comprises focus and tracking drive coils, mounted to the lens holder, and magnetic flux imparting means for imparting a magnetic flux to the focus and tracking drive coils. The lens driving apparatus is characterized in that the focus and tracking drive coils each are adapted to include a pair of plane coils having a coil axis perpendicular to a direction of focus. The lens driving apparatus is also characterized in that the magnetic flux imparting means impart magnetic fluxes in directions opposite to each other to two areas of the coils divided by imaginary lines inclined relative to the directions of both focus and tracking. The lens driving apparatus is further characterized in that the imaginary lines of the pair of coils each are arranged symmetrically with respect to a plane including the axis.

The aforementioned lens driving apparatus comprises a lens holder supported movably in directions of focus and tracking, and focus and tracking drive coils, mounted to the lens holder. The device also comprises magnetic flux imparting means for imparting a magnetic flux to the focus and tracking drive coils. The focus and tracking drive coils each are adapted to include a pair of plane coils, formed in planes perpendicular to a direction of jitter and having a coil axis parallel to the direction of jitter substantially perpendicular to the directions of focus and tracking. The magnetic flux imparting means are adapted to impart magnetic fluxes in directions opposite to each other along the direction of jitter to two areas of the plane coils divided by imaginary lines inclined relative to the directions of both focus and tracking. The imaginary lines of the pair of plane coils each are arranged symmetrically with respect to a plane parallel to the direction of jitter and including an optical axis. Accordingly, supplying a drive current to each of the pair of plane coils, which constitute the focus drive coil, in the same direction will cause the lens holder to be driven in the direction of focus. On the other hand, supplying a drive current to each of the pair of plane coils, which constitute the tracking drive coil, in directions opposite to each other will cause the lens holder to be driven in the direction of tracking.

To solve the aforementioned problems, a lens driving apparatus according to a ninth aspect of the present invention comprises a lens holder supported movably in directions of focus and tracking. The device also comprises drive coils, mounted to the lens holder, for generating a drive force in a direction of focus and a drive force in a direction of tracking to yield a resultant drive force, and magnetic flux imparting means for imparting a magnetic flux to the drive coils. The lens driving apparatus is characterized in that the drive coils each comprise a pair of coils arranged symmetrically with respect to a plane including an optical axis and perpendicular to the direction of tracking. The device is also characterized in that the magnetic flux imparting means impart magnetic fluxes in directions opposite to each other along the direction of jitter to two areas of the coils divided by imaginary lines inclined relative to the directions of both focus and tracking. The device is further characterized in that one of the pair of coils is supplied with an additive current of focus and tracking drive currents, whereas the other is supplied with a differential current of the focus and tracking drive currents.

Furthermore, a lens driving apparatus according to a tenth aspect of the present invention is the lens driving apparatus according to the ninth aspect of the present invention. The device is characterized by arranging the pair of coils in the same plane perpendicular to the direction of jitter.

Furthermore, a lens driving apparatus according to an eleventh aspect of the present invention is the lens driving apparatus according to the ninth aspect of the present invention. The device is characterized in that the pair of coils are plane coils provided on the same printed board parallel to a plane perpendicular to the direction of jitter.

Furthermore, a lens driving apparatus according to a twelfth aspect of the present invention is any one of the lens driving apparatuss according to the ninth to eleventh aspect of the present invention. The device is characterized in that the magnetic flux imparting means include magnetic pole surfaces opposite to the drive coils, the magnetic pole surfaces having different magnetic poles corresponding to the two areas.

Furthermore, a lens driving apparatus according to a thirteenth aspect of the present invention comprises a lens holder supported movably in directions of focus and tracking. The device also comprises drive coils, mounted to the lens holder, for generating a drive force in a direction of focus and a drive force in a direction of tracking to yield a resultant drive force, and magnetic flux imparting means for imparting a magnetic flux to the drive coils. The lens driving apparatus is characterized in that the drive coils comprise a first and second coil each arranged in a first plane perpendicular to a direction of jitter and symmetrically with respect to a plane including an optical axis and perpendicular to the direction of tracking. Here, a third and fourth coil each are arranged in a second plane parallel to the first plane and symmetrically with respect to a plane including the optical axis and perpendicular to the direction of tracking. A group of the first and second coils and a group of the third and fourth coils each are arranged symmetrically with respect to the optical axis. Said magnetic flux imparting means are adapted to impart magnetic fluxes in directions opposite to each other along the direction of jitter to two areas of the coils divided by imaginary lines inclined relative to the directions of both focus and tracking. Moreover, one of the first and second coils is supplied with an additive current of focus and tracking drive currents, whereas the other is supplied with a differential current of the focus and tracking drive currents. Of the third and fourth coils, a coil opposite to the one of the first and second coils supplied with the additive current is supplied with the differential current, whereas the coil opposite to the other coil supplied with the differential current is supplied with an additive current.

Furthermore, a lens driving apparatus according to a fourteenth aspect of the present invention is the aforementioned lens driving apparatus, characterized in that the first and second coils are provided on the same printed board parallel to a plane perpendicular to the direction of jitter. On the other hand, the third and fourth coils are provided on the same printed board parallel to a plane perpendicular to the direction of jitter.

Furthermore, a lens driving apparatus according to a fifteenth aspect of the present invention is any one of the aforementioned lens driving apparatuss according to the ninth to fourteenth aspect of the present invention. The lens driving apparatus is characterized in that the imaginary lines are inclined at 45 degrees relative to both the directions of focus and tracking.

Furthermore, a lens driving apparatus according to a sixteenth aspect of the present invention comprises a lens holder having a bearing hole to be fitted to a shaft extending in a direction of focus, made slidable along and rotatable about the shaft. The device also comprises drive coils, mounted to the lens holder, for generating a drive force in a direction of focus and a drive force in a direction of tracking to yield a resultant drive force, and magnetic flux imparting means for imparting a magnetic flux to the drive coils. The lens driving apparatus is characterized in that the drive coils each comprise a pair of coils, arranged symmetrically with respect to a plane including the shaft, having a coil axis perpendicular to a direction of focus. The lens driving apparatus is characterized in that the magnetic flux imparting means impart magnetic fluxes in directions opposite to each other to two areas of the coils divided by imaginary lines inclined relative to the directions of both focus and tracking. The lens driving apparatus is further characterized in that one of the pair of coils is supplied with an additive current of focus and tracking drive currents, whereas the other is supplied with a differential current of the focus and tracking drive currents.

The lens driving apparatus according to the ninth to sixteenth aspect of the present invention comprises a lens holder supported movably in directions of focus and tracking. The device also comprises drive coils, mounted to the lens holder, for generating a drive force in a direction of focus and a drive force in a direction of tracking to yield a resultant drive force, and magnetic flux imparting means for imparting a magnetic flux to the drive coils. The lens driving apparatus is configured such that the drive coils each comprise a pair of coils arranged symmetrically with respect to a plane including an optical axis and perpendicular to the direction of tracking. The device is also configured such that the magnetic flux imparting means impart magnetic fluxes in directions opposite to each other along the direction of jitter to two areas of the coils divided by imaginary lines inclined relative to the directions of both focus and tracking. The device is further configured such that one of the pair of coils is supplied with an additive current of focus and tracking drive currents, whereas the other is supplied with a differential current of the focus and tracking drive currents. Accordingly, it is made possible to reduce the number of coils when compared with prior art devices, thereby implementing a reduction in cost and size.

BRIEF DESCRIPTION OF THE DRAWINGS

These and other objects and advantages of the present invention will become clear from the following description with reference to the accompanying drawings, wherein:

FIG. 3 is a schematic perspective view illustrating the positional relationship among those such as a V-shaped magnet 11 and a V-shaped drive coil 80, which constitute a lens driving apparatus 150 according to a first embodiment of the present invention, FIGS. 19A to 19E are explanatory views illustrating how a plane-shaped coil is driven.

DETAILED DESCRIPTION OF THE PREFERRED EMBODIMENTS

Figure 1A:
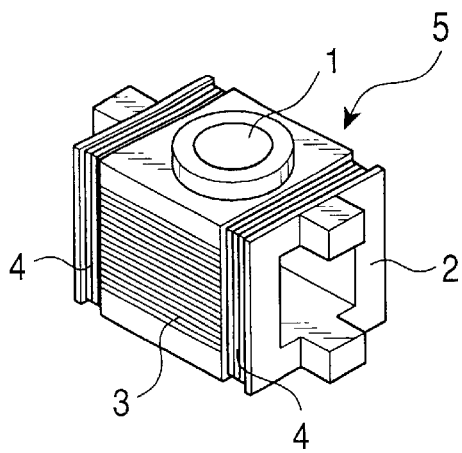
FIGS. 1A to 1C are views illustrating the relationship between plane coils and a magnet according to an example of a prior-art lens driving apparatus.
Figure 1B:
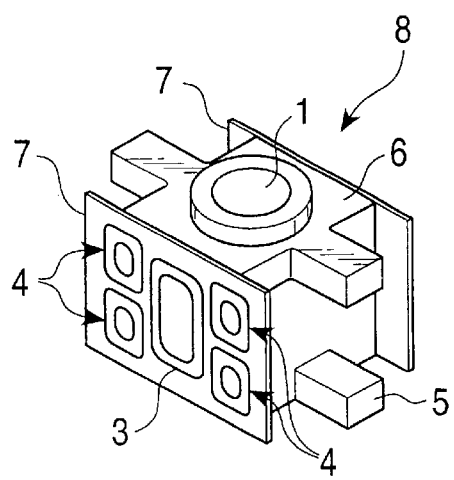
Figure 1C:
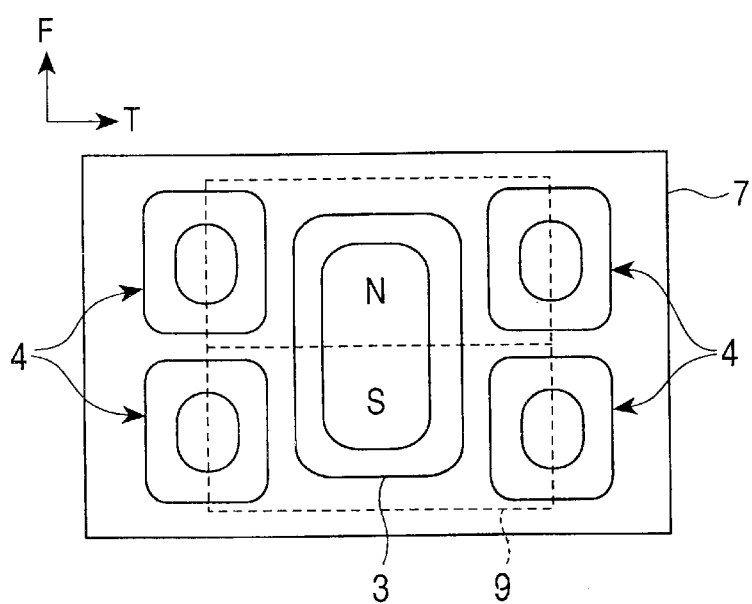
Figure 2A:
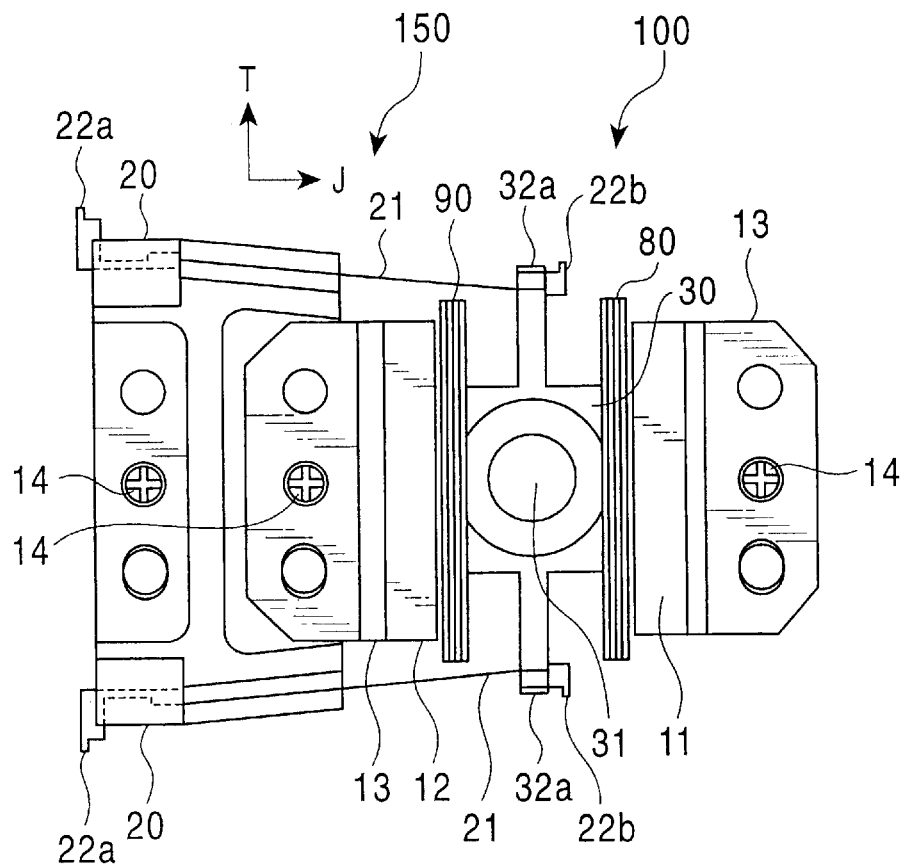
FIGS. 2A and 2B are plan and elevation views illustrating the outer appearance of a lens driving apparatus 150 according to a first embodiment of the present invention.
Figure 2B:
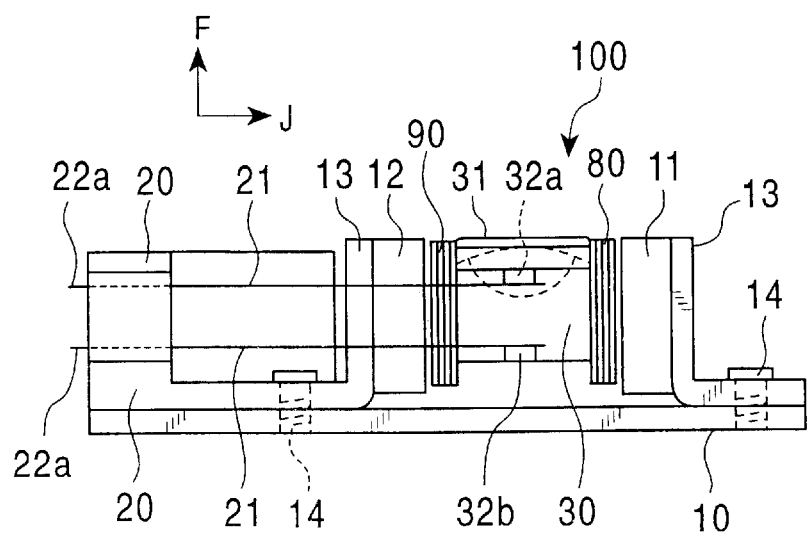

FIGS. 2A and 2B are views illustrating the outer appearance of a main portion of a lens driving apparatus 150 according to a first embodiment of the present invention. In addition, FIG. 3 is a schematic perspective view illustrating the positional relationship between a V-shaped magnet 11 and a V-shaped drive coil 80, and between an inverted V-shaped magnet 12 and an inverted V-shaped drive coil 90, each of which constitutes the lens driving apparatus 150. Incidentally, FIG. 2A is a top view illustrating the lens driving apparatus 150, while FIG. 2B is a side view illustrating the lens driving apparatus 150.

The lens driving apparatus 150 according to the first embodiment of the present invention has a pair of L-shaped yokes 13 fixed with a plurality of screws 14 on a plate-shaped actuator base 10. The L-shaped yokes 13 are arranged opposite to each other and spaced apart by a predetermined magnetic gap, with the V-shaped magnet 11 being fixed to one of the yokes and the inverted V-shaped magnet 12 being fixed to the other, the magnets being employed for producing magnetic fields. A movable portion 100, which is supported with four support wires 21 of a support base 20 fixed with a screw 14 to the actuator base 10, is disposed in between the V-shaped magnet 11 and the inverted V-shaped magnet 12.

For example, the V-shaped magnet 11 is a three-way split multi-pole magnet the magnetic pole surface of which is formed into a square of the N-pole surface of a right-angled triangle magnet and the S-pole surfaces of two right-angled triangle magnets. The V-shaped magnet 11 has the N-pole surface arranged in the shape of a letter V at the center thereof and the S-pole surfaces arranged on the right and left of the N-pole surface. That is, the V-shaped magnet 11 has magnetic poles split with imaginary straight lines (to be detailed later) that are inclined relative to the direction of focus and tracking. Moreover, the V-shaped magnet 11 is adapted to produce magnetic fluxes, opposite to each other, in the direction of jitter, that is, in a direction substantially perpendicular to the direction of focus and tracking. In addition, the inverted V-shaped magnet 12 is a three-way split multi-pole magnet the magnetic pole surface of which is formed into a square of the S-pole surface of a right-angled triangle magnet and the N-pole surfaces of two right-angled triangle magnets. The inverted V-shaped magnet 12 has the S-pole surface arranged in the shape of an inverted letter of V at the center thereof and the N-pole surfaces arranged on the right and left of the S-pole surface.

The movable portion 100 comprises a lens holder 30, generally shaped in a square and accommodating an objective lens 31 therein. The movable portion 100 also comprises the V-shaped drive coil 80 fixed with adhesive or the like to the side of the lens holder 30, opposite to the V-shaped magnet 11 in the direction of jitter (shown by arrow J). The movable portion 100 further comprises the inverted V-shaped drive coil 90 or the V-shaped drive coil 80 fixed with adhesive or the like to the side of the lens holder 30, opposite to the inverted V-shaped magnet 12 in the direction of jitter, being rotated by 180 degrees. Furthermore, the four support wires 21 are adapted to support four holder potions 32a, 32b projected from the lens holder 30 in the direction of tracking (shown by arrow T). The movable portion 100 is thereby made movable in the direction of focus (shown by arrow F) and tracking.

The support wires 21 are made of an electrically conductive bar-shaped or plate-shaped elastic material. One ends thereof are rolled and enlarged to form withdrawal portions 22a, and part of the support wires 21 is integrally formed by the out-sert shaping method or the like at the time of forming the support base 20. On the other hand, the other ends of the support wires 21 are likewise rolled and enlarged to form connection portions 22b, which are in turn fixed with adhesive or the like to the four holder potions 32a, 32b provided on the lens holder 30.

Figure 4A:
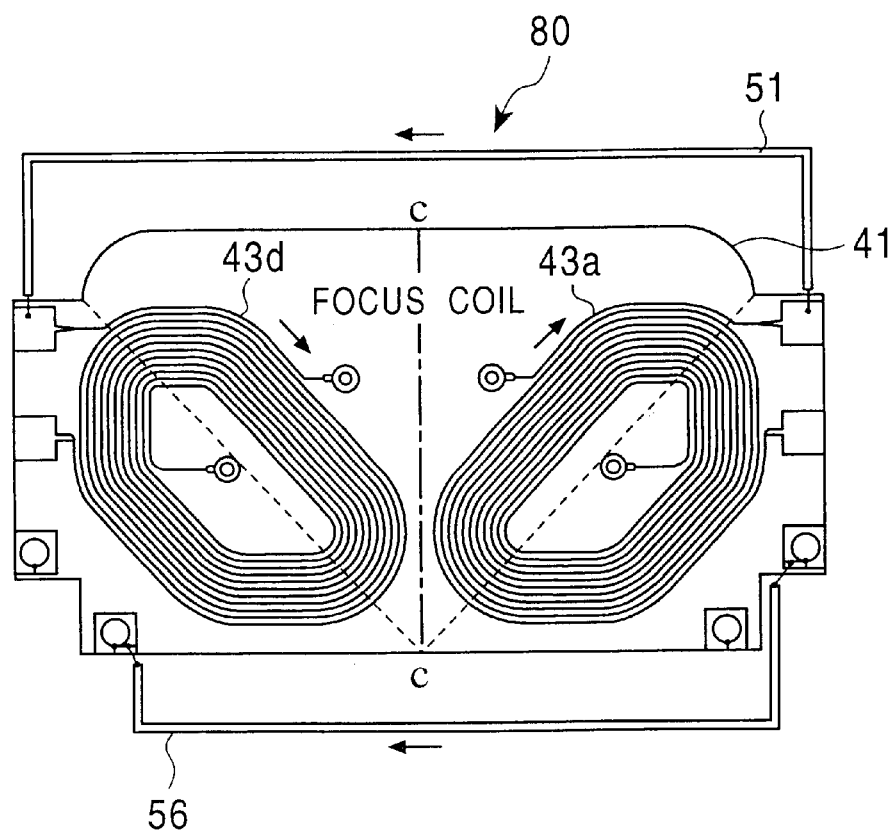
FIGS. 4A and 4B are schematic views illustrating the configuration a V-shaped drive coil 80 that constitutes a lens driving apparatus 150 according to a first embodiment of the present invention.

The lens driving apparatus 150 or the first embodiment according to the present invention is characterized by the configuration of the aforementioned V-shaped drive coil 80. Now, the configuration of the V-shaped drive coil 80 is outlined with reference to FIGS. 4A and 4B. Incidentally, FIG. 4A is a schematic plan view illustrating the V-shaped drive coil 80, while FIG. 4B is a schematic side view illustrating the V-shaped drive coil 80.

Figure 4B:
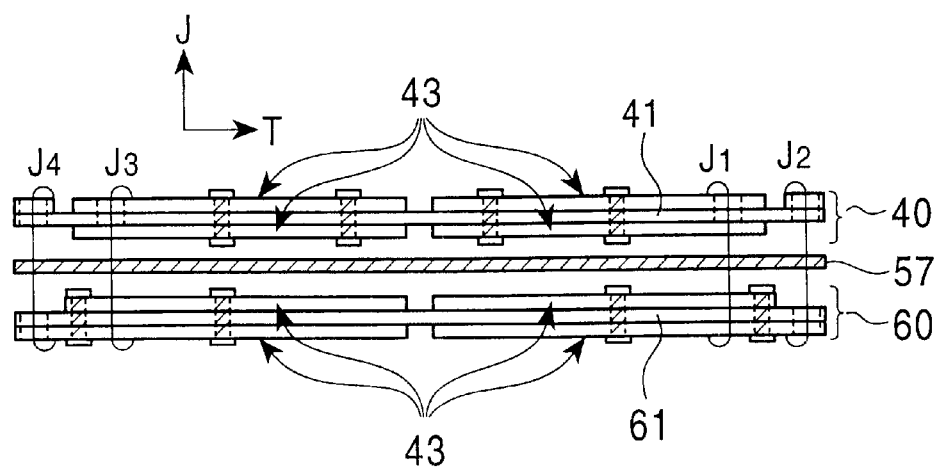

For example, as shown in FIG. 4B, the V-shaped drive coil 80 has a focus drive coil 40 and a tracking drive coil 60, which are arranged one on the other with an insulating sheet 57 or the like interposed therebetween and connected to each other using a plurality of jumper leads J1–J4. As shown in FIG. 4A, the focus drive coil 40 is provided with focus coils 43, two on the front side and two on the reverse side, by patterning and etching the copper foil to form the same pattern on the both sides of a focus board 41 or a double-sided copper laminated printed board made of such as glass epoxy. Likewise, the tracking drive coil 60 is provided with four tracking coils 63, which are formed on a tracking board 61 or a double-sided copper laminated printed board. Moreover, the inverted V-shaped drive coil 90 is the V-shaped drive coil 80 that is rotated by 180 degrees. Thus, it is to be understood that the configuration of the V-shaped drive coil 80 and the inverted V-shaped drive coil 90 is to be explained by describing the focus drive coil 40 and the tracking drive coil 60 in sequence, which constitute the V-shaped drive coil 80.

First, the configuration of the focus drive coil 40 constituting the V-shaped drive coil 80 is explained below with reference to FIGS. 5A and 5B. Incidentally, FIG. 5A includes a plan view illustrating the front side of the focus drive coil 40 (the upper view) and a perspective plan view illustrating the reverse side of the focus drive coil 40 (the lower view), while FIG. 5B is a cross-sectional view illustrating the focus drive coil 40.

Figure 5A:
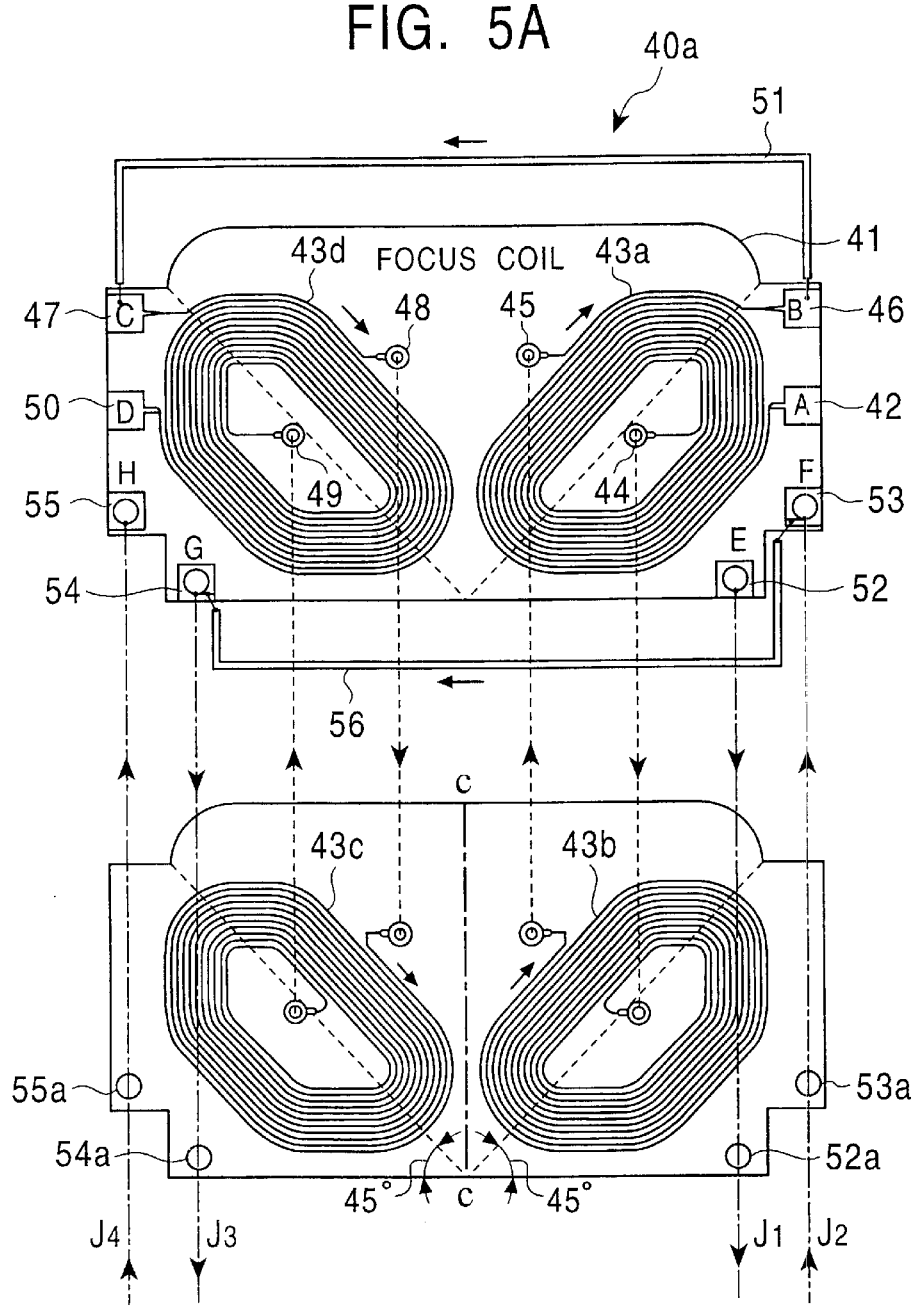
FIGS. 5A and 5B are wiring diagrams illustrating a focus drive coil that constitutes a V-shaped drive coil of a lens driving apparatus according to a first embodiment of the present invention.
Figure 5B:
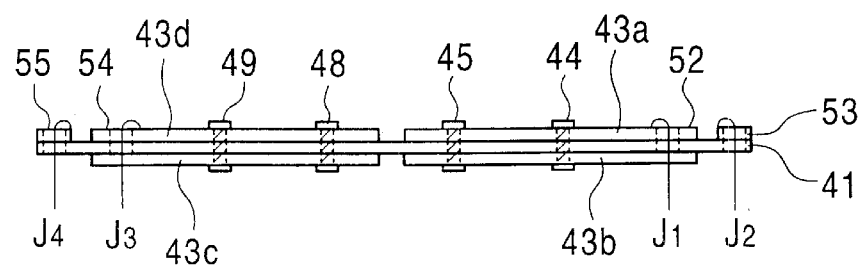

As shown in FIGS. 5A and 5B, the focus drive coil 40 is a plane-shaped coil formed as follows. That is, a first focus coil 43a and a fourth focus coil 43d are so formed in the same substantially elliptical shape on the copper foil on the front side of the focus board 41 as to be in parallel to the direction of jitter and symmetrical with respect to a plane including the optical axis (shown by line C). A second focus coil 43b and a third focus coil 43c, both having the same shape as that mentioned above, are formed on the copper foil on the reverse side at the same positions as those mentioned above. The first focus coil 43a and the second focus coil 43b, disposed to the right of the optical axis, are connected to each other via two through-holes 44, 45. The third focus coil 43c and the fourth focus coil 43d, disposed to the left of the optical axis, are connected to each other via two through-holes 48, 49. Thus, pairs of focus coils 43a, 43b, 43c, and 43d, each pair consisting of coils disposed on the right and left, are connected in series by means of an external wire 51.

Incidentally, the aforementioned through-holes 44, 45, 48, and 49, each illustrated with a double circle, may be formed by injecting silver paste to holes that penetrate the copper foils on the front and reverse sides and then by baking the silver paste. Alternatively, the copper foils on the front and reverse sides are connected to each other by plating the inner surface of the holes penetrating the copper foils on the front and reverse sides with copper.

The focus coils 43, having an elliptical shape and constituting the focus drive coil 40, are arranged across the N- and S-poles of the V-shaped magnet 11, two longer sides of which are magnetized in a three-way split manner. Accordingly, the first focus coil 43*a* and the second focus coil 43*b* are formed by being rotated approximately 45 degrees in the clockwise direction relative to the optical axis. On the other hand, the third focus coil 43*c* and the fourth focus coil 43*d* are formed by being rotated approximately 45 degrees in the counterclockwise direction relative to the optical axis. By being arranged as such, the focus drive coil 40 can generate the focus drive force, described later, equally in the lower and upper direction of the optical axis.

Next, a method for wiring the focus drive coil 40 is explained. One end of the first focus coil 43*a* formed on the front side of the focus board 41 is connected to a focus terminal "A" 42 formed on the outer rim portion on the front side of the focus board 41. The first focus coil 43*a* connected to the focus terminal "A" 42 is formed in a spiral fashion from the outer to inner circumference in the clockwise direction, with the other end being connected to the through-hole 44 for the first focus coil. The through-hole 44 for the first focus coil is electrically connected to the second focus coil 43*b* for the second focus coil on the reverse side. The second focus coil 43*b* for the second focus coil on the reverse side is formed in a spiral fashion from the inner to outer circumference in the clockwise direction and connected to the through-hole 45 for second focus coil. The through-hole 45 for the second focus coil is connected to a focus terminal "B" 46 via the copper foil formed on the front side. Accordingly, the first focus coil 43*a* and the second focus coil 43*b* are connected in series between the focus terminal "A" 42 and the focus terminal "B" 46 via the through-holes 44, 45 for the first and second focus coils.

On the other hand, a focus terminal "C" 47 formed on the front side of the focus board 41 is connected to the through-hole 48 for the third focus coil via the copper foil. The through-hole 48 for the third focus coil is connected to the third focus coil 43*c* on the reverse side. The third focus coil 43*c* is formed in a spiral fashion from the outer to inner circumference in the clockwise direction and connected to the through-hole 49 for the fourth focus coil. The through-hole 49 for the fourth focus coil is connected to the fourth focus coil 43*d* formed on the front side. The fourth focus coil 43*d* is formed in a spiral fashion from the inner to outer circumference in the clockwise direction and connected to a focus terminal "D" 50 formed on the front side of the focus board 41. Accordingly, the third focus coil 43*c* and the fourth focus coil 43*d* are connected in series between the focus terminal "C" 47 and the focus terminal "D" 50 via the through-holes 48, 49 for the third and fourth focus coils. The connection of the external wire 51 between the focus terminal "B" 46 and the focus terminal "C" 47 allows the four focus coils 43*a*–43*d* to be connected in series between the focus terminal "A" 42 and the focus terminal "D" 50, thereby forming the focus drive coil 40. Such focus drive coil 40 is formed in a plane perpendicular to the direction of jitter and forms a pair of plane coils having coil axes that are parallel to the direction of jitter. Thus, the focus drive coil 40 is arranged opposite to the V-shaped magnet 11 and a focus drive current is supplied to between the focus terminal "A" 42 and the focus terminal "D" 50, thereby causing a drive force to be generated in the direction of focus.

Moreover, as shown in FIGS. 5A and 5B, four tracking terminals "E" 52, "F" 53, "G" 54, "H" 55 are provided except for the two focus coils 43 and the four focus terminals "A" 42, "B" 50, "C" 46, "D" 47, on the front side of the focus board 41. The four tracking terminals "E" 52, "F" 53, "G" 54, "H" 55, each having a square copper foil portion, are provided to establish connection with the tracking board 61 and with four tracking coils 63*a*–63*d*, which is described later. There are formed connection holes 52*a*, 53*a*, 54*a*, 55*a* at around the center of each copper foil of the tracking terminals "E" 52, "F" 53, "G" 54, "H" 55, respectively.

These tracking terminals "E" 52, "F" 53, "G" 54, "H" 55 are used as shown in FIG. 5B to connect the focus board 41 to the tracking board 61 as follows. That is, the jumper leads J1–J4 are soldered to the copper foil portion of the tracking terminals "E" 52, "F" 53, "G" 54, "H" 55, respectively. Then, each of the jumper leads J1–J4 is drawn to the tracking board 61 side via the connection holes 52*a*, 53*a*, 54*a*, 55*a*.

Next, the configuration of the tracking drive coil 60 is explained below with reference to FIGS. 5A, 5B, 6A, and 6B. Incidentally, FIG. 6A includes a plan view illustrating the reverse side of the tracking drive coil 60 (the upper view) and a perspective plan view illustrating the front side of the tracking drive coil 60 (the lower view). FIG. 6B is a cross-sectional view illustrating the tracking drive coil 60.

Figure 6A:
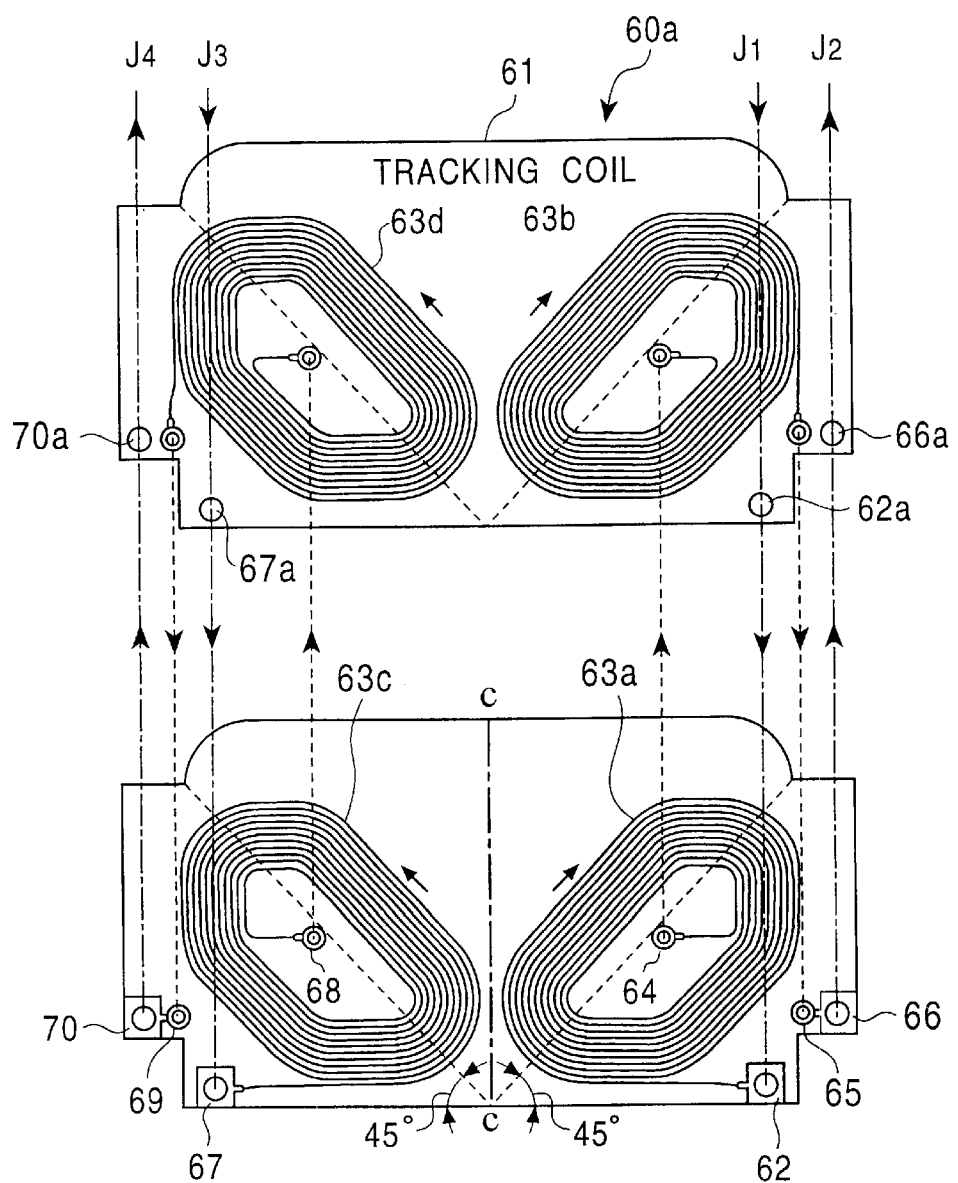
FIGS. 6A and 6B are wiring diagrams illustrating a tracking drive coil that constitutes a V-shaped drive coil of a lens driving apparatus according to a first embodiment of the present invention.
Figure 6B:
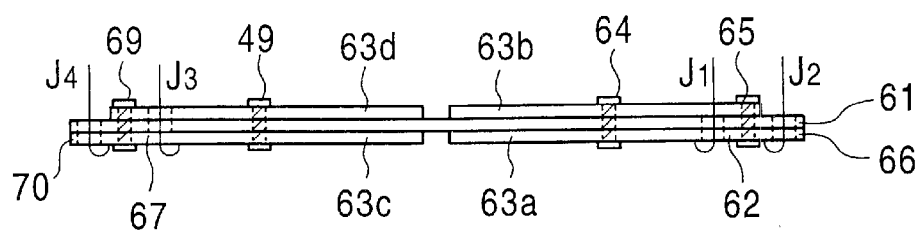

As shown in FIGS. 6A and 6B, the tracking drive coil 60 is a plane-shaped coil formed as follows. That is, a second tracking coil 63*b* and a fourth tracking coil 63*d* are so formed in the same substantially elliptical shape on the copper foil on the reverse side of the tracking board 61 as to be in parallel to the direction of jitter and symmetrical with respect to a plane including the optical axis (shown by line C). A first tracking coil 63*a* and a third tracking coil 63*c*, both having the same shape as that mentioned above, are formed on the copper foil on the front side at the same positions as those mentioned above. The first tracking coil 63*a* and the second tracking coil 63*b*, disposed to the right of the optical axis, are connected to each other via two through-holes 64, 65. The third tracking coil 63*c* and the fourth tracking coil 63*d*, disposed to the left of the optical axis, are connected to each other via two through-holes 68, 69. Thus, pairs of tracking coils 63*a*–63*d*, each pair consisting of coils disposed on the right and left, are connected in series by means of an external wire 56.

The tracking coils 63, having an elliptical shape and constituting the tracking drive coil 60, are arranged across the N- and S-poles of the V-shaped magnet 11, two longer sides of which are magnetized in a three-way split manner. Accordingly, the first tracking coil 63*a* and the second tracking coil 63*b* are formed by being rotated approximately 45 degrees in the clockwise direction relative to the optical axis. On the other hand, the third tracking coil 63*c* and the fourth tracking coil 63*d* are formed by being rotated approximately 45 degrees in the counterclockwise direction relative to the optical axis. By being arranged as such, the tracking drive coil 60 can generate the tracking drive force, described later, equally in the right and left direction of the optical axis.

On the front side of the tracking board 61, provided are repeater terminals 62, 66, 67, 70, each having a square. copper foil portion, at the positions corresponding to the tracking terminals "E" 52, "F" 53, "G" 54, "H" 55, which are formed on the aforementioned focus board 41. In addition, there are formed connection holes 62*a*, 66*a*, 67*a*, 70*a* at the center of each copper foil. The jumper leads J1–J4 soldered to the copper foil portion of the tracking terminals "E" 52, "F" 53, "G" 54, "H" 55 on the focus board 41 are drawn via the connection holes 52*a*, 53*a*, 54*a*, 55*a* and the connection holes 66*a*, 67*a*, 70*a* of the tracking board 61, and then soldered to the copper foil portion of the repeater terminals 62, 66, 67, 70, respectively. The focus board 41 and the tracking board 61 are thereby connected to each other.

Next, a method for wiring the tracking drive coil 60 is explained. The repeater terminal 62 of the tracking board 61 is connected to the tracking terminal "E" 52 of the focus board 41 via the jumper lead J1. The first tracking coil 63*a* connected to the repeater terminal 62 formed on the front side of the tracking board 61 is formed in a spiral fashion from the outer to inner circumference in the clockwise direction. The first tracking coil 63*a* is connected to the second tracking coil 63*b* formed on the reverse side via the through-hole 64 for the first tracking coil. The second tracking coil 63*b* is formed in a spiral fashion from the inner to outer circumference in the counterclockwise direction and is connected to the repeater terminal 66 via the through-hole 65 for the second tracking coil. The repeater terminal 66 is connected to the tracking terminal "F" 53 of the focus board 41 via the jumper lead J2. That is, the first tracking coil 63*a* and the second tracking coil 63*b* are connected via the two through-holes 64, 65 and the jumper leads J1, J2 in series to the tracking terminal "E" 52 and the tracking terminal "F" 53, which are formed on the focus board 41.

On the other hand, the repeater terminal 67 of the tracking board 61 is connected to the tracking terminal "G" 54 of the focus board 41 via the jumper lead J3. The third tracking coil 63*c* connected to the repeater terminal 67 formed on the front side of the tracking board 61 is formed in a spiral fashion from the outer to inner circumference in the counterclockwise direction. Then, the third tracking coil 63*c* is connected to the fourth tracking coil 63*d* formed on the reverse side via the through-hole 68. The fourth tracking coil 63*d* is formed in a spiral fashion from the inner to outer circumference in the counterclockwise direction and is connected to the repeater terminal 70 via the through-hole 69 for the fourth tracking coil. The repeater terminal 70 is connected to the tracking terminal "H" 55 of the focus board 41 via the jumper lead J4.

That is, the third tracking coil 63*c* and the fourth tracking coil 63*d* are connected via the two through-holes 68, 69 and the jumper leads J3, J4 in series to the tracking terminal "G" 54 and the tracking terminal "H" 55, which are formed on the focus board 41. Thus, the external wire 56 is connected between the tracking terminal "F" 53 and the. tracking terminal "G" 54, thereby forming the tracking drive coil 60 having the four tracking coils 63*a*–63*d* connected in series between the tracking terminal "E" 52 and the repeater terminal 70. Such tracking drive coil 60 is formed in a plane perpendicular to the direction of jitter, also forming a pair of plane coils having the coil axis parallel to the direction of jitter. Thus, the tracking drive coil 60 is arranged opposite to the V-shaped magnet 11 and a tracking drive current is supplied to between the tracking terminal "E" 52 and the repeater terminal 70, thereby generating a drive force in the direction of tracking.

As described above, the V-shaped drive coil 80 comprising the focus drive coil 40 and the tracking drive coil 60 is fixed to one of the sides of the lens holder 30. In addition, the inverted V-shaped drive coil 90 or the V-shaped drive coil 80 that is rotated by 180 degrees is fixed to the other side of the lens holder 30. Then, the focus drive coils 40 of the V-shaped drive coil 80 and the inverted V-shaped drive coil 90 are connected in series to each other. On the other hand, the tracking drive coils 60 of the V-shaped drive coil 80 and the inverted V-shaped drive coil 90 are connected in series to each other.

Figure 7A:
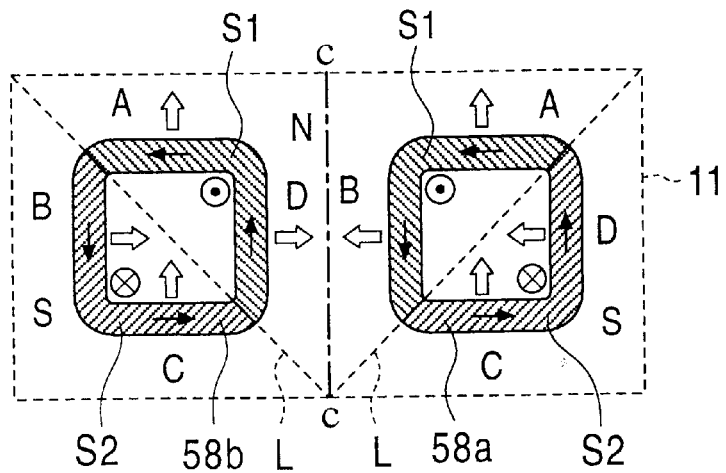
FIGS. 7A to 7C are explanatory views illustrating how a plane-shaped coil is driven.
Figure 7B:
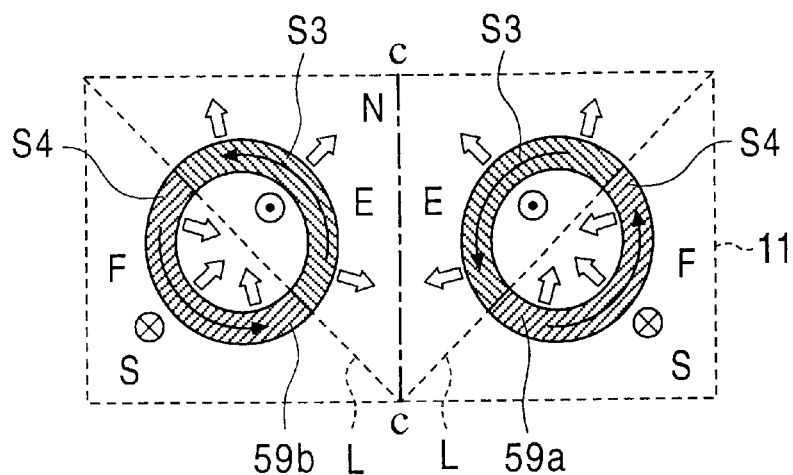
Figure 7C:
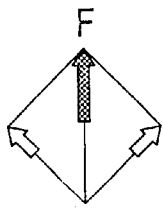

Next, how the plane coils are driven is explained with reference to FIGS. 7A to 7C. Incidentally, FIGS. 7A to 7C are schematic explanatory views illustrating drive coils arranged opposite to the V-shaped magnet 11. FIG. 7A is a plan view illustrating a case where, for example, a pair of square drive coils 58*a*, 58*b* are employed. FIG. 7B is a plan view illustrating a case where, for example, a pair of circular drive coils 59*a*, 59*b* are employed. FIG. 7C is a vector diagram showing a total drive force. Incidentally, the circles each having a dot therein denote a magnetic flux penetrating from the reverse to front side of the drawing, whereas the circles each having a cross therein denote a magnetic flux penetrating from the front to reverse side of the drawing. In addition, the arrows inside the drive coils 58*a*, 58*b* denote the direction of the currents flowing through the drive coils 58*a*, 58*b*, while the blank arrows in the figure denote partial drive forces of the drive coils 58*a*, 58*b*.

As described above, the V-shaped magnet 11 or magnetic flux imparting means is a three-way split multi-pole magnet that is formed in a square shape and comprise the N-pole surface of a right-angled triangle magnet and the S-pole surfaces of two right-angled triangle magnets. The V-shaped magnet 11 has the N-pole surface arranged in the shape of a letter V at the center thereof and the S-pole surfaces arranged on the right and left of the N-pole surface. Thus, the boundary lines (referred to as imaginary straight lines L) between the N-pole surface at the center and the S-pole surfaces on the right and left are so arranged as to be rotated 45 degrees in the clockwise and counterclockwise direction relative to the optical axis, respectively. Moreover, as shown in FIG. 7A, the drive coils 58*a*, 58*b* are adapted to allow diagonal lines thereof to be laid on the aforementioned imaginary straight lines L of the squares. This means that regions S1 of the drive coils 58*a*, 58*b* for receiving the magnetic flux from the N-pole surface of the V-shaped magnet 11 are equal to the other regions S2 of the drive coils 58*a*, 58*b* for receiving the magnetic flux from the S-pole surface of the V-shaped magnet 11. Thus, in the regions S1, S2 split with the imaginary straight lines L, the drive coils 58*a*, 58*b* are provided with magnetic fluxes, opposite in direction to each other, in the direction of jitter. In addition, the pair of the square drive coils 58*a*, 58*b* is arranged to be symmetrical with respect to the optical axis.

For example, one region S1 of the drive coil 58*a* located on the right is provided with a magnetic flux penetrating from the reverse to front side of the drawing by means of the N-pole surface. Supplying a current to the drive coil 58*a* in the direction shown by the arrows will cause a partial drive force to be generated vertically upward at portion A of the drive coil 58*a* and horizontally leftward at portion B. Moreover, the other region S2 of the drive coil 58*a* is provided with a magnetic flux penetrating from the front to reverse side of the drawing by means of the S-pole surface. Thus, supplying a current to the drive coil 58*a* in the direction shown by the arrows will cause a partial drive force to be generated vertically upward at portion C of the drive coil 58*a* and horizontally leftward at portion D of the drive coil 58*a*. Therefore, as shown in FIG. 7C, the drive coil 58*a* allows the partial drive forces produced vertically upward at portions A, C and the partial drive forces produced horizontally leftward at portions B, D to be added to yield a resultant drive force directed at 45 degrees to the left upward. That is, a drive force is generated which is directed vertically leftward relative to the imaginary straight line L.

In addition, one region S1 of the drive coil 58b located on the left sits on the N-pole surface. Consequently, supplying a current to the drive coil 58b in the same direction as that of the current flowing through the drive coil 58a located on the right will cause a partial drive force to be generated vertically upward at portion A and horizontally rightward at portion D. Furthermore, the other region S2 of the drive coil 58b is located on the S-pole surface. Consequently, a partial drive force is generated horizontally rightward at portion B of the drive coil 58b and vertically upward at portion C. Therefore, as shown in FIG. 7C, the drive coil 58b located on the left allows the partial drive forces produced vertically upward at portions A, C and horizontally rightward at portions B, D to be added to generate a resultant drive force directed at 45 degrees to the right upward. Accordingly, as shown in FIG. 7C, the drive forces of a pair of the square drive coils 58a, 58b, one on the right and the other on the left, are added to yield a resultant drive force (shown by the shaded arrow) directed vertically upward or in the direction of focus.

Furthermore, as shown in FIG. 7B, the circular drive coils 59a, 59b have centerlines thereof located on the imaginary straight lines L. Thus, regions S3 of the drive coils 59a, 59b for receiving the magnetic flux from the N-pole surface of the V-shaped magnet 11 are equal to the other regions S4 of the drive coils 59a, 59b for receiving the magnetic flux from the S-pole surface of the V-shaped magnet The drive coils 59a, 59b generate driving forces radially from portions E, F, however, the partial drive forces at around the imaginary straight lines L are equal in magnitude but opposite in direction to each other, thus being canceled out. For example, like in the foregoing, the drive coil 59a located on the right generates a drive force directed at 45 degrees to the left upward, whereas the drive coil 59b located on the left generates a drive force directed at 45 degrees to the right upward. Accordingly, as shown in FIG. 7C, the drive forces of a pair of the circular drive coils 59a, 59b, one on the right and the other on the left, are added to yield a resultant drive force directed vertically upward or in the direction of focus.

As described above, the drive coils 58a, 58b are located on the imaginary straight lines L of the V-shaped magnet 11 in a manner such that the areas of the two regions S1, S2 are equal to each other. In addition, the regions S1 and the other regions S2 are provided with magnetic fluxes that are opposite in direction to each other, whereby the drive coils 58a, 58b are driven accurately in the direction of focus. Moreover, the pair of drive coils 58a, 58b can obtain a drive force in the direction of tracking when currents are supplied thereto which are opposite in direction to each other. That is, the drive coils 58a, 58b are not limited to a particular shape. However, this means that if the drive coils 58a, 58b are each symmetrical with respect to the imaginary straight line L and the areas of the two regions S1, S2 are equal to each other, accurate focus or tracking drive forces can be obtained when the partial drive forces generated at the right and left drive coils 58a, 58b are added.

Figure 8A:
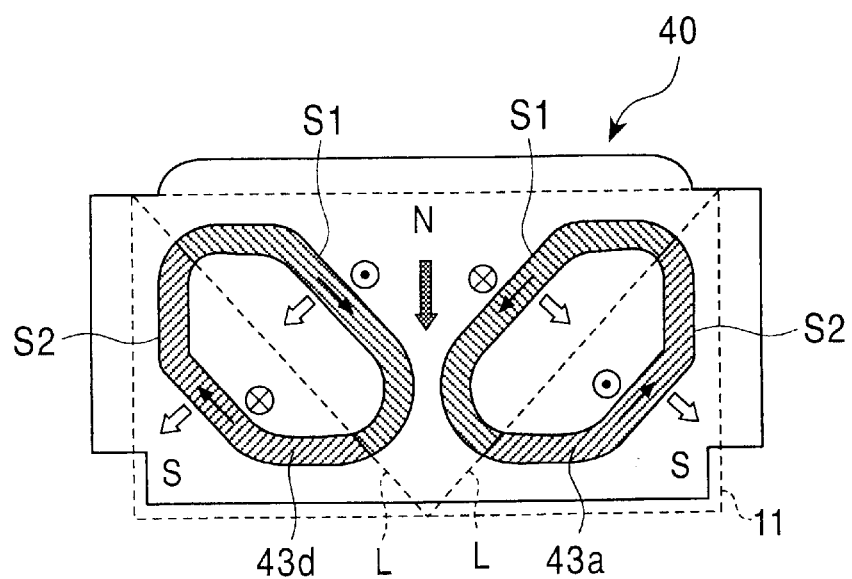
FIGS. 8A to 8C are explanatory views illustrating a drive force in the direction of focus in a lens driving apparatus according to a first embodiment of the present invention.
Figure 8B:
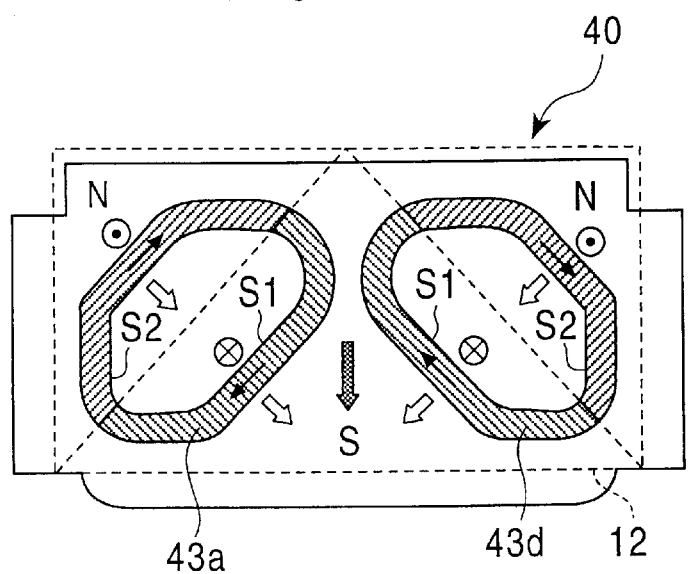
Figure 8C:
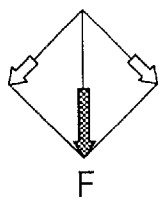

Next, the operation of the focus drive coil 40 is explained with reference to FIGS. 8A to 8C. FIGS. 8A to 8C are operational explanatory views illustrating the positional relationship between the focus drive coil 40 shown schematically and the V-shaped magnet 11, and between the focus drive coil 40 and the inverted V-shaped magnet 12. Here, in the focus drive coil 40, only a first focus coil 42a and a fourth focus coil 42d on the front side are shown. FIG. 8A is a plan view illustrating the positional relationship between the focus drive coil 40 constituting the V-shaped drive coil 80 and the V-shaped magnet 11. FIG. 8B is a plan view illustrating the positional relationship between the focus drive coil 40 constituting the inverted V-shaped drive coil 90 (or the focus drive coil 40 that is rotated by 180 degrees) and the inverted V-shaped magnet 12. FIG. 8C is a vector diagram illustrating focus drive forces produced by the focus drive coil 40.

As shown in FIG. 8A, the two focus coils 43a, 43d (a pair of plane coils) of the focus drive coil 40 are located opposite to the V-shaped magnet 11 or magnetic flux imparting means. The focus coils 43a, 43d are arranged in a manner such that each of the longer sides of the focus coils 43 sits across the N- and S-pole surfaces. That is, the focus coils 43a, 43d are each arranged in a manner such that the area of regions S1 of the focus drive coil 40 is equal to that of the other regions S2 with respect to the two imaginary straight lines L of the V-shaped magnet 11. Consider a case where a drive current is supplied in the direction shown in the figure and a magnetic flux is imparted in the direction shown in the figure from the V-shaped magnet 11 to the first focus coil 43a. In this case, the two regions S1, S2 of the first focus coil 43a each generates a drive force (shown by the blank arrows) at 45 degrees to the right downward relative to the optical axis. In addition, a drive current is supplied to the fourth focus coil 43d in the same direction as that of the currents flowing through the first focus coil 43a. Thus, the two regions S1, S2 of the fourth focus coil 43d each generates a drive force at 45 degrees to the left downward relative to the optical axis. Therefore, the drive forces of the two focus coils 43a, 43d in the direction of focus are added to yield a focus drive force (shown by the shaded arrow) directed downward relative to the optical axis as shown in FIG. 8C.

Furthermore, the focus drive coil 40 that is rotated by 180 degrees is located opposite to the inverted V-shaped magnet 12 as shown in FIG. 8B. Consider a case where a drive current is supplied in the direction shown in the figure and a magnetic flux is imparted in the direction shown in the figure from the inverted V-shaped magnet 12 to the first focus coil 43a. In this case, the two regions S1, S2 of the first focus coil 43a each generates a drive force at 45 degrees to the right downward relative to the optical axis. In addition, a drive current is supplied to the fourth focus coil 43d in the same direction as that of the currents flowing through the first focus coil 43a. Thus, the two regions S1, S2 of the fourth focus coil 43d each generates a drive force at 45 degrees to the left downward relative to the optical axis. Therefore, like in the foregoing, the drive forces of the two focus coils 43a, 43d are added to yield a resultant focus drive force directed downward relative to the optical axis as shown in FIG. 8C. In addition, supplying to the focus drive coil 40 a drive current opposite in direction to the one shown in the figure would cause a focus drive force to be generated in the focus drive coil 40 upward relative to the optical axis.

Figure 9A:
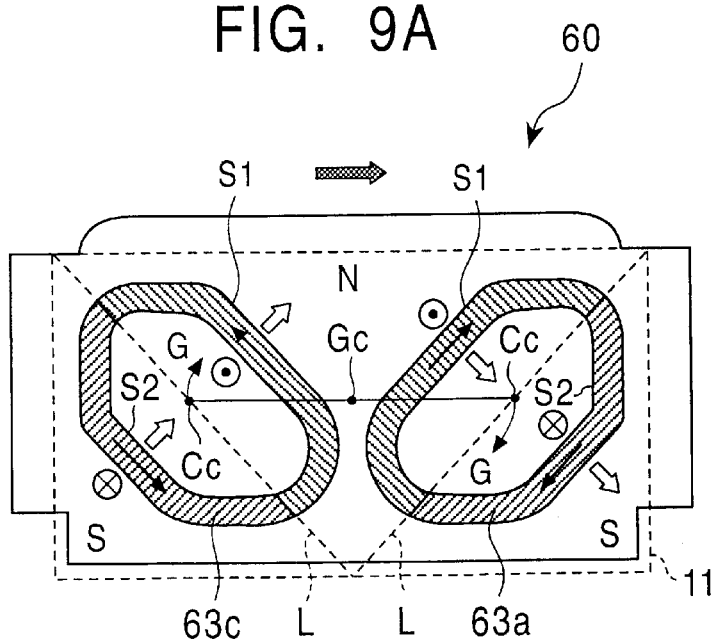
FIGS. 9A to 9C are explanatory views illustrating a drive force in the direction of tracking in a lens driving apparatus according to a first embodiment of the present invention.
Figure 9B:
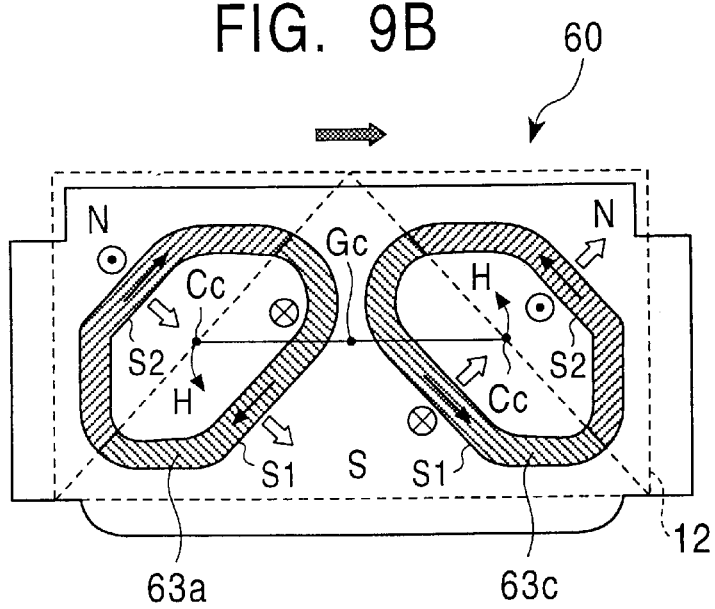
Figure 9C:
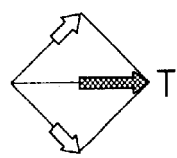

Next, the operation of the tracking drive coil 60 is explained with reference to FIGS. 9A to 9C. Like FIGS. 8A to 8C, FIGS. 9A to 9C are operational explanatory views illustrating the positional relationship between the tracking drive coil 60 shown schematically and the V-shaped magnet 11, and between the tracking drive coil 60 and the inverted V-shaped magnet 12. Here, in the tracking drive coil 60, only the first tracking coil 63a and the third tracking coil 63c on the front side are shown. FIG. 9A is a plan view illustrating the positional relationship between the tracking drive coil 60 constituting the V-shaped drive coil 80 and the V-shaped magnet 11. FIG. 9B is a plan view, illustrating the positional relationship between the tracking drive coil 60 constituting the inverted V-shaped drive coil 90 (or the tracking drive coil 60 that is rotated by 180 degrees) and the inverted V-shaped magnet 12. FIG. 9C is a vector diagram illustrating tracking drive forces produced by the tracking drive coil 60.

As shown in FIG. 9A, the two tracking coils 63a, 63c (a pair of plane coils) of the tracking drive coil 60 are located opposite to the V-shaped magnet 11 or magnetic flux imparting means. The tracking coils 63a, 63c are arranged in a manner such that each of the longer sides of the tracking coils 63 sits across the N- and S-pole surfaces. That is, the tracking coils 63a, 63c are each arranged in a manner such that the area of regions S1 of the tracking drive coil 60 is equal to that of the other regions S2 with respect to the two imaginary straight lines L of the V-shaped magnet 11.

Consider a case where a drive current is supplied in the direction shown in the figure and a magnetic flux is imparted in the direction shown in the figure from the V-shaped magnet 11 to the first tracking coil 63a. In this case, the two regions S, S2 of the first tracking coil 63a each generates a drive force (shown by the blank arrows) at 45 degrees to the right downward relative to the optical axis. In addition, a drive current is supplied to the third tracking coil 63c in the same direction as that of the currents flowing through the first tracking coil 63a. Thus, the two regions S1, S2 of the third tracking coil 63c each generates a drive force at 45 degrees to the right upward relative to the optical axis. Therefore, the drive forces of the two tracking coils 63a, 63c are added to yield a resultant tracking drive force (shown by the shaded arrow) directed straight to the right relative to the optical axis as shown in FIG. 9C.

Furthermore, the tracking drive coil 60 that is rotated by 180 degrees is located opposite to the inverted V-shaped magnet 12 as shown in FIG. 9B. Consider a case where a drive current is supplied in the direction shown in the figure and a magnetic flux is imparted in the direction shown in the figure from the inverted V-shaped magnet 12 to the first tracking coil 63a. In this case, the two regions S1, S2 of the first tracking coil 63a each generates a drive force at 45 degrees to the right downward relative to the optical axis. In addition, a drive current is supplied to the third tracking coil 63c in the direction opposite to that of the current flowing through the first tracking coil 63a. Thus, the two regions S1, S2 of the third tracking coil 63c each generates a drive force at 45 degrees to the right upward relative to the optical axis. Therefore, like in the foregoing, the drive forces of the two tracking coils 63a, 63c are added to yield a resultant tracking drive force directed straight to the right relative to the optical axis as shown in FIG. 9C.

As described above, the two tracking coils 63a, 63c of the tracking drive coil 60 are arranged in parallel to the direction of jitter on the imaginary straight lines L formed symmetrically with respect to a plane including the optical axis. Thus, the center of gravity of the tracking drive coil 60 sits substantially on the center of the tracking board 61. In addition, the center of gravity (Gc) of the two tracking coils 63a, 63c sits substantially on the center of each of the tracking coils 63a, 63c. Consider a case where the first tracking coil 63a generates a drive force at 45 degrees downward relative to the optical axis and the third tracking coil 63c generates a drive force at 45 degrees upward. In this case, as shown in FIG. 9A, the tracking drive coil 60 generates a rotational drive force in the clockwise direction (shown by arrow G) about the center of gravity (Gc) of the tracking board 61.

In addition, with the tracking drive coil 60 arranged opposite to the inverted V-shaped magnet 12, the first tracking coil 63a generates a drive force at 45 degrees downward relative to the optical axis. On the other hand, the third tracking coil 63c generates a drive force at 45 degrees upward relative to the optical axis. However, since the first and third tracking coils 63a, 63c are each located at the position that is rotated by 180 degrees with respect to the position shown in FIG. 9A, a rotational drive force is generated in the counterclockwise direction (shown by arrow H) as shown in FIG. 9B.

As described above, the inverted V-shaped drive coil 90 is the V-shaped drive coil 80 that is rotated by 180 degrees. The V-shaped drive coil 80 is fixed to the one side of the lens holder 30 oriented in the direction of jitter, whereas the inverted V-shaped drive coil 90 is fixed to the other side of the lens holder 30 oriented in the direction of jitter. For example, consider a case where the V-shaped drive coil 80 generates a rotational drive force in the clockwise direction and the inverted V-shaped drive coil 90 generates a rotational drive force in the counterclockwise direction. In this case, the both drive forces cancel out each other, thereby causing no rotational force to be produced in the movable portion 100. That is, the lens driving apparatus 150 of the present invention comprises the inverted V-shaped drive coil 90 or the V-shaped drive coil 80 that is rotated by 180 degrees and the inverted V-shaped magnet 12 to cancel out the rotational drive force produced in the V-shaped drive coil 80.

As described above, the V-shaped drive coil 80 for use in the lens driving apparatus 150 or the first embodiment of the present invention comprises the focus drive coil 40 and the tracking drive coil 60, stacked on a plane perpendicular to the direction of jitter. Here, substantially elliptical plane coils formed in a pair, each arranged on a printed circuit board generally at angle of 45 degrees, are arranged symmetrically with respect to the optical axis. The pairs are stacked to provide four focus coils 43 to form the focus drive coil 40. On the other hand, the tracking drive coil 60 is formed of four tracking coils 63 that are formed, arranged, and stacked in the same manner as the focus drive coil 40. Therefore, the V-shaped drive coil 80 can be made substantially the same in size as the V-shaped magnet 11 that is arranged opposite thereto. Thus, the magnetic flux of the V-shaped magnet 11 is effectively imparted to the focus drive coil 40 and the tracking drive coil 60, constituting the V-shaped drive coil 80.

Figure 10A:
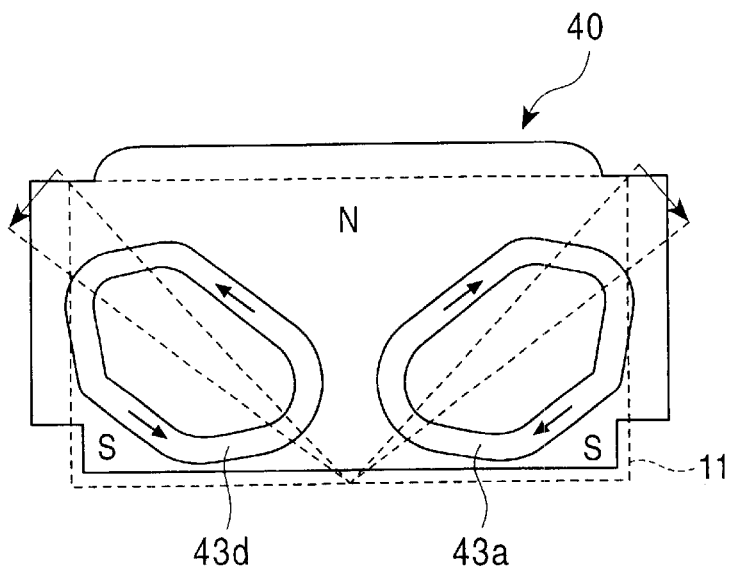
FIGS. 10A to 10D are explanatory views illustrating the relationship between the inclination of a focus coil and a tracking coil, and a drive force in a lens driving apparatus according to a first embodiment of the present invention.
Figure 10B:
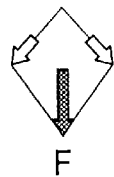
Figure 10C:
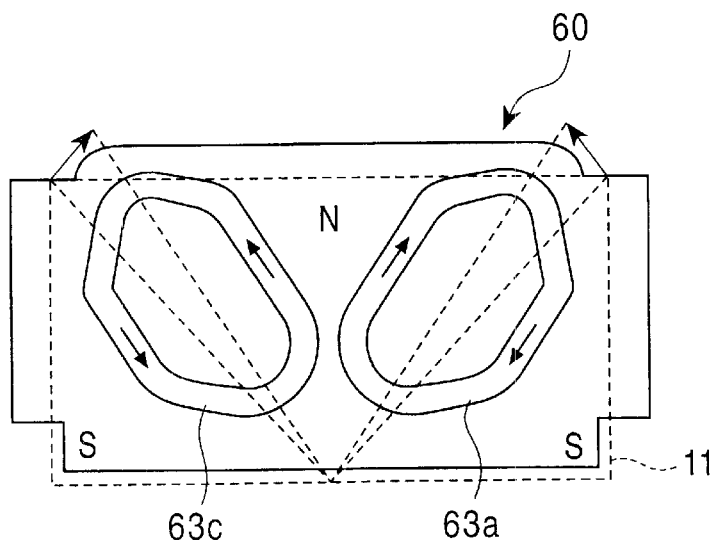
Figure 10D:
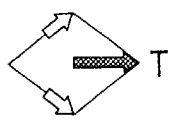

Incidentally, the imaginary straight lines L of the focus coils 43, the tracking coils 63, and the three-way split multi-pole magnet, constituting the V-shaped drive coil 80 for use in the lens driving apparatus 150 of the present invention are inclined at 45 degrees relative to the optical axis. However, the angle of inclination is not limited to this embodiment. For example, FIG. 10A illustrates the focus coils 43 inclined at an angle greater than 45 degrees, thereby providing an increased focus drive force when compared with one provided at 45 degrees (see FIG. 10B). In addition, FIG. 10C illustrates the tracking coils 63 inclined at an angle less than 45 degrees, thereby providing an increased tracking drive force when compared with one provided at 45 degrees (see FIG. 10D). That is, when inclined at the same angle as that of the focus coils 43, the tracking coils 63 would provide a decreased tracking drive force. On the other hand, when inclined at the same angle as that of the tracking coils 63, the focus coils 43 would provide a decreased focus drive force. Accordingly, the focus coils 43 and the tracking coils 63 are adapted to be inclined at the optimal angle relative to the optical axis in consideration of a focus and tracking drive current or the like.

Figure 11A:
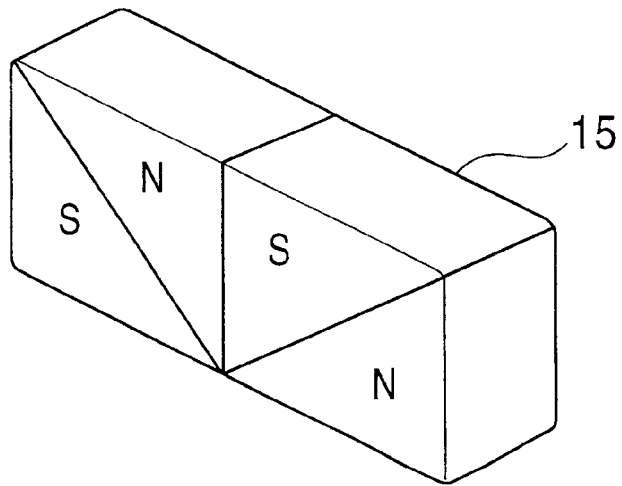
FIGS. 11A and 11B are views illustrating different structures of a V-shaped magnet and an inverted V-shaped magnet.
Figure 11B:
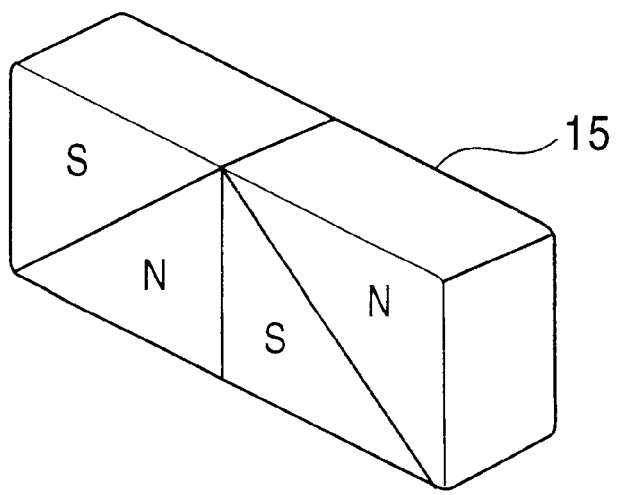

In addition, the V-shaped magnet 11 or the inverted V-shaped magnet 12 for use in the lens driving apparatus 150 of the present invention may comprise four-way split multi-pole magnets shown in FIGS. 11A and 11B. Incidentally, FIG. 11A illustrates a V-shaped magnet 15 comprising two pairs of two-way split multi-pole magnets, each pair being formed in a square of S- and N-pole surfaces of a right-angled triangle magnet, with different poles disposed adjacent to each other. FIG. 11B is the V-shaped magnet 15 that is rotated by 180 degrees. With the V-shaped magnet 15, the focus drive coil 40 or the tracking drive coil 60 are wired differently to change the direction of the current flowing through the focus coils 43 or the tracking coils. This makes it possible to provide the focus drive force and the tracking drive force, which are the same as those shown with reference to FIGS. 8A–8C and 9A–9C, as described above.

Figure 12A:
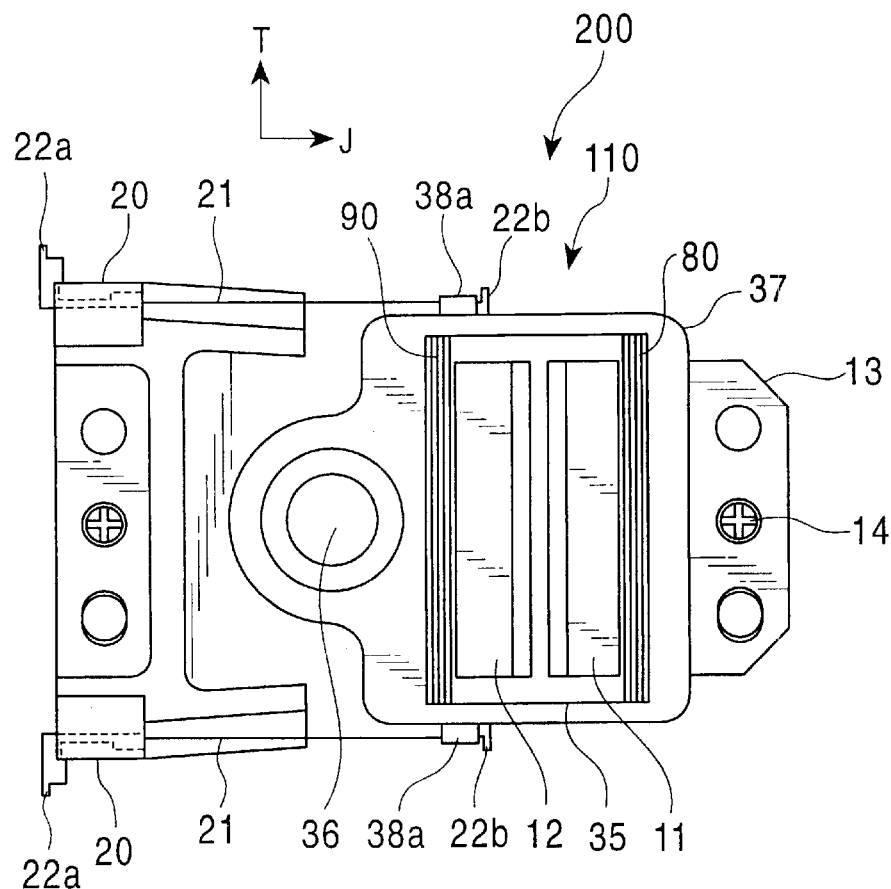
FIGS. 12A and 12B are plan and elevation views illustrating the outer appearance of a main portion of a lens driving apparatus according to a second embodiment of the present invention.
Figure 12B:
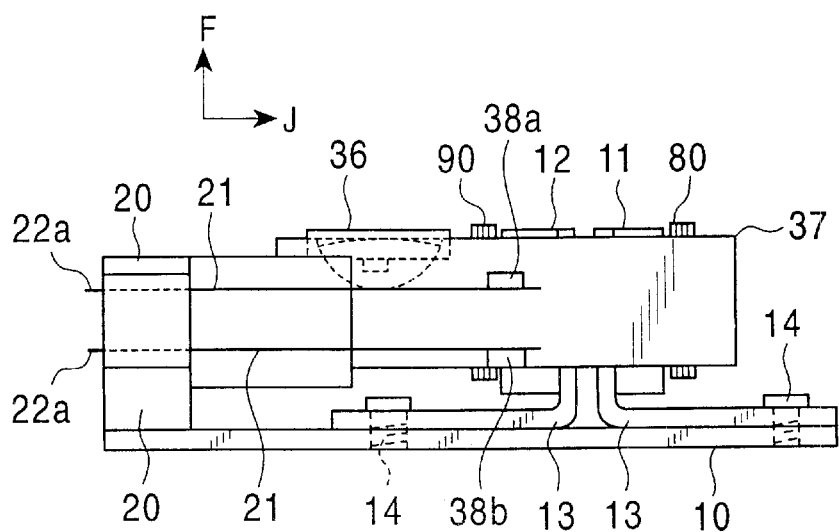

Next, the configuration of a lens driving apparatus 200 according to a third embodiment of the present invention is explained with reference to FIGS. 12A and 12B. Incidentally, FIG. 12A is a top view illustrating the lens driving apparatus 200 and FIG. 12B is a side view illustrating the lens driving apparatus 200. The lens driving apparatus 200 according to the second embodiment of the present invention comprises a pair of L-shaped yokes 13 fixed with a plurality of screws 14 on a plate-shaped actuator base 10. The L-shaped yokes 13 are arranged with the rear sides thereof facing closely to each other, with a V-shaped magnet 11 and an inverted V-shaped magnet 12 being fixed thereto, the magnets being employed for producing magnetic fields. An opening portion 35 of a movable portion 110 supported with four support wires 21 of a support base 20 fixed with a screw 14 to the actuator base 10 is interposed to provide a predetermined magnetic gap between the V-shaped magnet 11 and the inverted V-shaped magnet 12.

The movable portion 110 comprises a lens holder 37 having the opening portion 35 formed in the shape of a square at around the center thereof and accommodating an objective lens 36 therein. The movable portion 110 also comprises the V-shaped drive coil 80 fixed with adhesive or the like to one side of the inside of the opening portion 35 in the direction of jitter. The movable portion 110 further comprises the inverted V-shaped drive coil 90 fixed to the other side. The V-shaped drive coil 80 in the opening portion 35 is located opposite to the V-shaped magnet 11, while the inverted V-shaped drive coil 90 of the opening portion 35 opposite to the inverted V-shaped magnet 12. Furthermore, the four support wires 21 of the support base 20 are adapted to support four holder potions 38a, 38b projected from the lens holder 37 in the direction. The movable portion 110 is thereby made movable in the direction of focus and tracking. Other aspects are the same as those of the lens driving apparatus 150 according to the first embodiment and thus not detailed here.

Figure 13A:
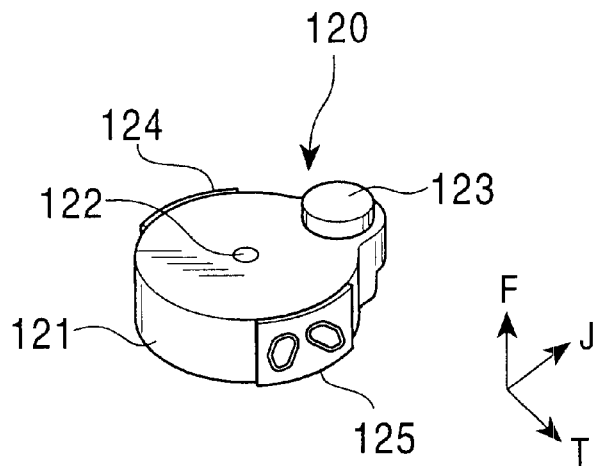
FIGS. 13A to 13C are views illustrating the outer appearance of a main portion of a lens driving apparatus according to a third embodiment of the present invention.
Figure 13B:
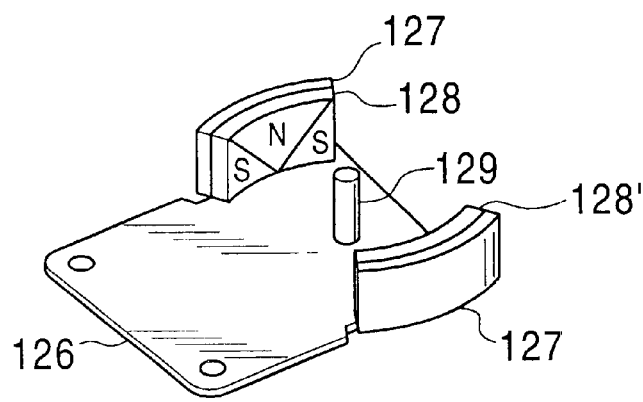
Figure 13C:
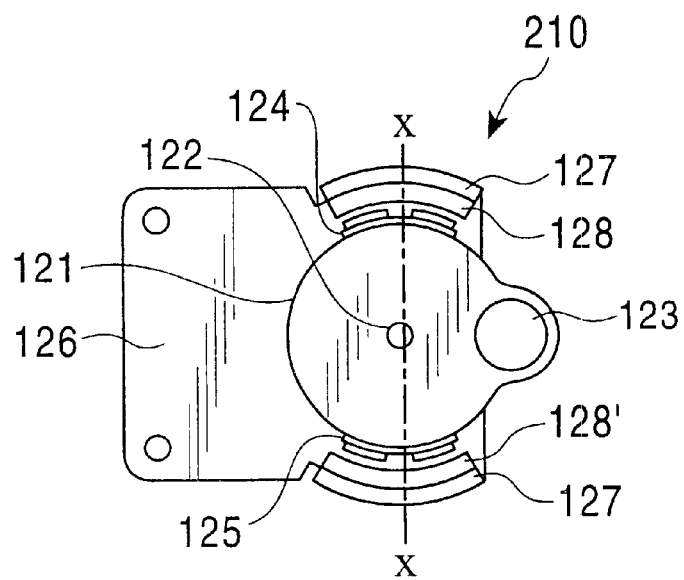

Next, the configuration of a lens driving apparatus 210 according to a third embodiment of the present invention is explained with reference to FIGS. 13A to 13C. Incidentally, FIG. 13A is a perspective view illustrating a movable portion 120 that constitutes the lens driving apparatus 210. FIG. 13B is a perspective view illustrating a yoke base 126 to which fixed is a V-shaped magnet 128 that constitutes the lens driving apparatus 210 and FIG. 13C is a top view illustrating the lens driving apparatus 210. The lens driving apparatus 210 shown in FIGS. 13A to 13C is referred to as a shaft sliding type, the movable portion 120 constituting such lens driving apparatus 210 being formed substantially in a cylindrical shape. A lens holder 121 of the movable portion 120 is provided, generally at the center thereof, with a bearing hole 122, and an objective lens 123 is arranged at a position deviated from the bearing hole 122 toward the direction of jitter (shown by arrow J). In addition, a focus drive coil 124 is fixed to the lens holder 121 on one side thereof oriented toward the direction of tracking and a tracking drive coil 125 on the other side thereof oriented toward the direction of tracking with adhesive or the like.

Moreover, the actuator base 126 that constitutes the lens driving apparatus 210 is provided with a pair of yokes 127, each formed in the shape of a letter L, one on the right a n d the other on the left in the direction of tracking. A pair of curved V-shaped magnets 128, 128' is fixed with adhesive or the like to the inner sides of such yokes 127 in the direction of tracking. A support shaft 129 is also fixed by press fitting or welding to a substantially central portion of the pair of V-shaped magnets 128, 128'. The movable portion 120 is supported rotatably and movably up and down by engaging the bearing hole 122 of the lens holder 121 with the support shaft 129 of the actuator base 126. In addition, the focus drive coil 124 and the tracking drive coil 125 are arranged opposite to the V-shaped magnets 128, 128', respectively, with a predetermined magnetic gap provided therebetween.

As described above, the lens driving apparatuss 150 and 200 according to the first and second embodiments allow the movable portions 100 and 110 to generate a rotational drive force, respectively. For this reason, the devices are made up of the V-shaped drive coil 80 comprising the focus drive coil 40 and the tracking drive coil 60, and the inverted V-shaped drive coil 90 or the V-shaped drive coil 80 rotated by 180 degrees. However, the lens driving apparatus 210 according to the third embodiment employs the shaft sliding type, so that the aforementioned rotational drive force is not produced in the movable portion 120. Accordingly, the lens driving apparatus 210 is adapted to have the focus drive coil 124 which comprises, for example, only the focus drive coil 40 of the V-shaped drive coil 80 at a position opposite to one of the V-shaped magnets 128, 128'. The lens driving apparatus 210 is also adapted to have the tracking drive coil 125 which comprises, for example, only the tracking drive coil 60 of the V-shaped drive coil 80 at a position opposite to the other one of the V-shaped magnets 128, 128'.

For example, as shown in FIG. 13C, suppose that a plane X includes the support shaft 129 constituting the lens driving apparatus 210 and is parallel to the direction of tracking. Then, plane coils formed in a pair that constitute the focus drive coil 40 and the tracking drive coil 125 are arranged symmetrically with respect to the aforementioned X. Thus, when a drive force is generated in the direction of focus as described with reference to FIGS. 8A#8C and 9A#9C, the movable portion 120 is caused to slide up and down. On the other hand, when a drive force is generated in the direction of tracking, the movable portion 120 is caused to rotate in the clockwise or counterclockwise direction about the support shaft 129. As described above, the lens driving apparatus 210 according to the third embodiment can be formed with less number of drive coils and reduce the weight of the movable portion 120.

Figure 14:
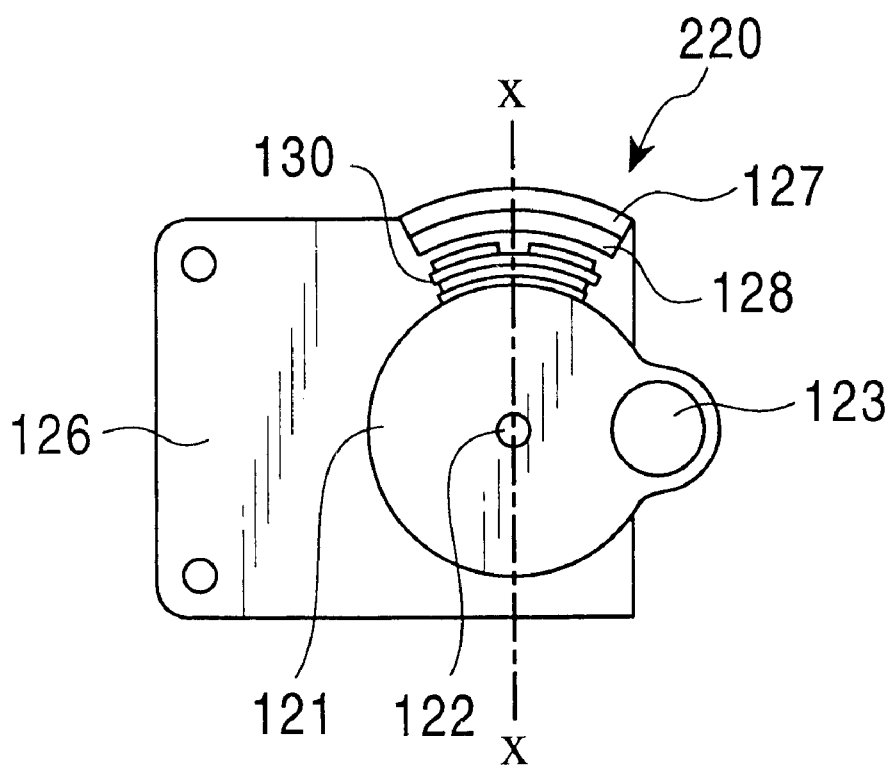
FIG. 14 is a view illustrating the outer appearance of a main portion of a lens driving apparatus according to a fourth embodiment of the present invention.

Now, a lens driving apparatus 220 configured as shown in FIG. 14 is conceivable as a fourth embodiment of the present invention. The lens driving apparatus 220 shown in FIG. 14 is provided with a drive coil 130 having the focus drive coil 124 and the tracking drive coil 125, one stacked on the other, the drive coil 130 being fixed to one side of the movable portion 120. In addition, a yoke 127 is provided on one side of the actuator base 126 and a curved V-shaped magnet 128 is arranged on the inner side of the yoke 127. The drive coil 130 may be made up of the aforementioned V-shaped drive coil 80. Forming the lens driving apparatus 220 as such will make it possible to further reduce the number of parts, the size, and the weight.

Incidentally, the lens driving apparatus 210 according to the third embodiment comprises the focus drive coil 124 and the tracking drive coil 125. However, it is believed obvious that the same effect can be obtained by forming the lens driving apparatus 210 with the V-shaped drive coil 80 and the V-shaped magnet 11, and the inverted V-shaped drive coil 90 and the inverted V-shaped magnet 12, which are employed in the lens driving apparatuss 150, 200 according to the first and second embodiment.

The lens driving apparatus 150 according to the aforementioned embodiment of the present invention comprises the focus drive coil 40 and the tracking drive coil 60, which are stacked in a plane perpendicular to the direction of jitter on the V-shaped drive coil 80 that constitutes the lens driving apparatus 150. The focus drive coil 40 has a pair of substantially elliptical plane coils that are arranged substantially at an angle of 45 degrees on a printed circuit board and symmetrically with respect to a line. The tracking drive coil 60 is made up of the four tracking coils 63 that are formed, arranged, and stacked in the same manner as the focus drive coil 40. Therefore, this makes it possible to form the V-shaped drive coil 80 substantially in the same size as the outer dimensions of the V-shaped magnet 11, which is to be arranged opposite thereto. This also makes it possible to effectively make use of the magnetic flux of the magnet and provide the V-shaped drive coil 80 reduced in size.

Figure 15A:
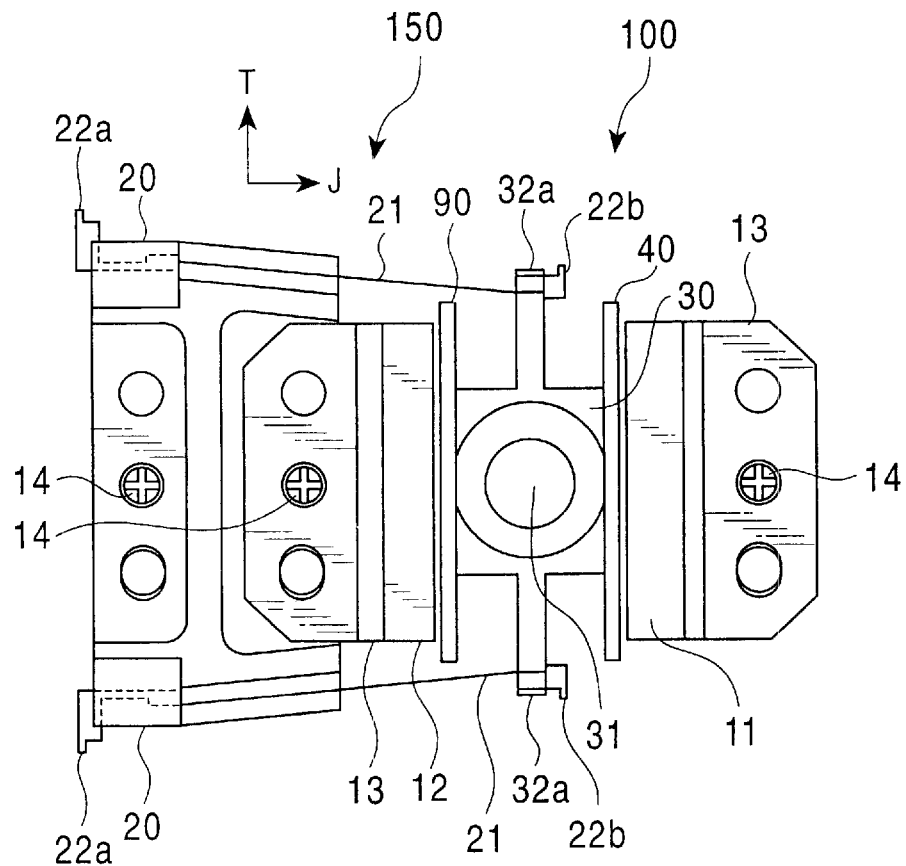
FIGS. 15A and 15B are plan and elevation views illustrating the outer appearance of a main portion of a lens driving apparatus according to a fifth embodiment of the present invention.
Figure 15B:
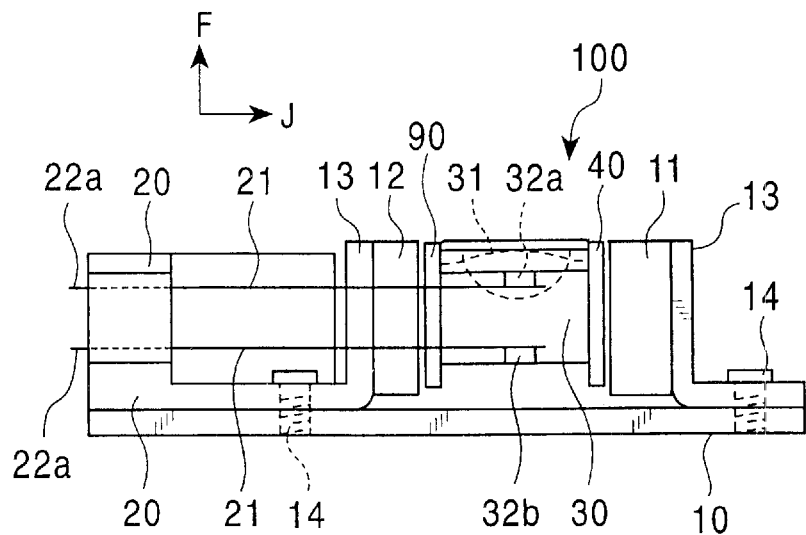

FIGS. 15A and 15B are views illustrating the outer appearance of the main portion of a lens driving apparatus 150' according to a fourth embodiment of the present invention. The configuration of the lens driving apparatus 150' is explained with reference to FIGS. 15A and 15B. Incidentally, FIG. 15A is a top view of the lens driving apparatus 150' and FIG. 15B is a side view of the lens driving apparatus 150'.

The lens driving apparatus 150' according to the fourth embodiment of the present invention has the same configuration as that of the first embodiment shown in FIGS. 2A and 2B. The components that are the same as those of the first embodiment are provided with the same reference symbols and not explained repeatedly. Like in FIGS. 2A and 2B, the lens driving apparatus 150' has the movable portion 100 arranged in the magnetic gap defined by the V-shaped magnet 11 and the inverted V-shaped magnet 12.

The movable portion 100 comprises the lens holder 30, a V-shaped drive coil 140, and an inverted V-shaped drive coil 190. Here, the V-shaped drive coil 140 is fixed with adhesive or the like to the side of the lens holder 30 opposite to the V-shaped magnet 11 in the direction of jitter (shown by arrow J). The inverted V-shaped drive coil 190 is fixed with adhesive or the like to the side of the lens holder 30 opposite to the inverted V-shaped magnet 12 in the direction of jitter.

Figure 16A:
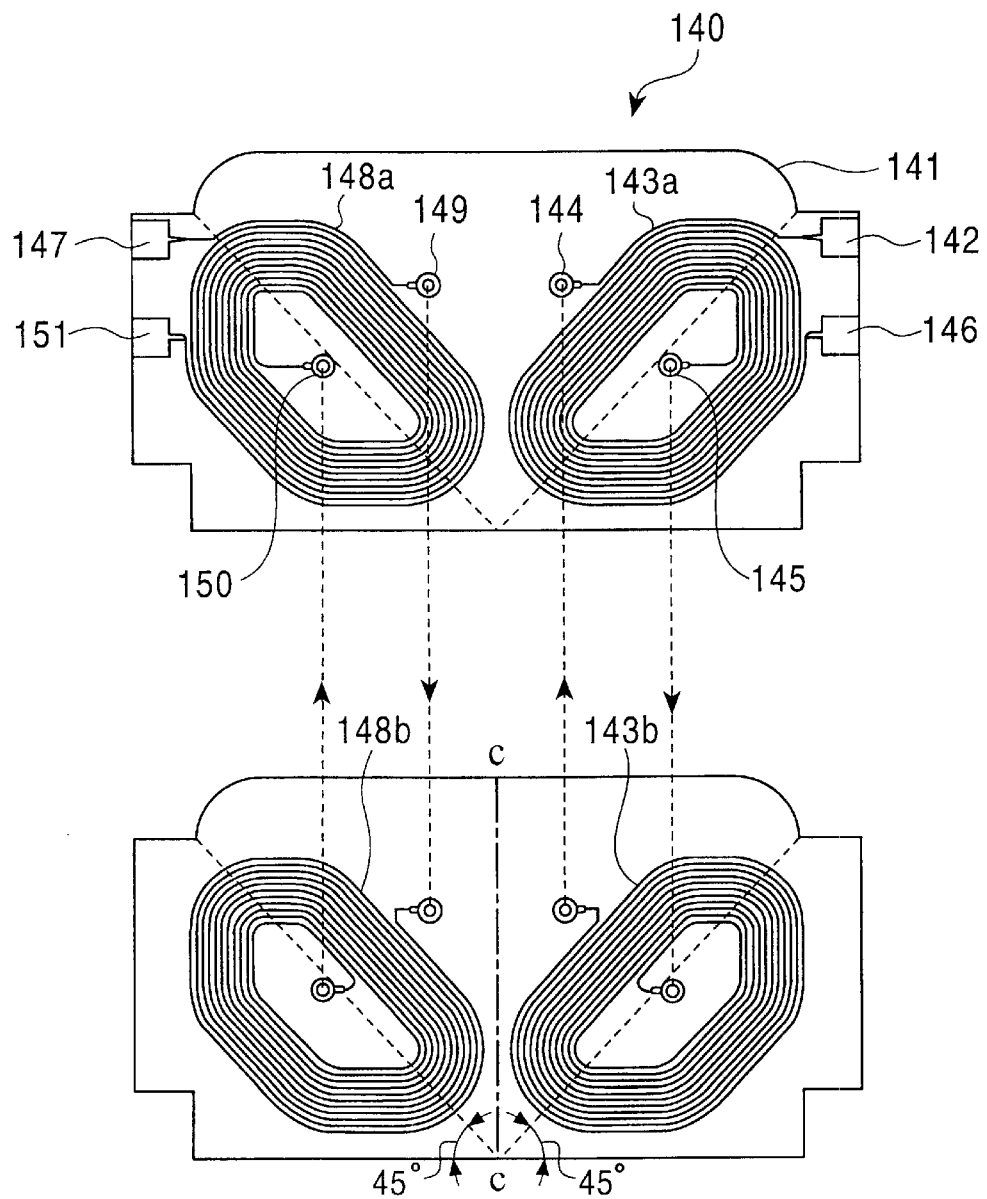
FIGS. 16A and 16B are views illustrating the structure of a V-shaped drive coil for use in a lens driving apparatus according to a fifth embodiment of the present invention.
Figure 16B:
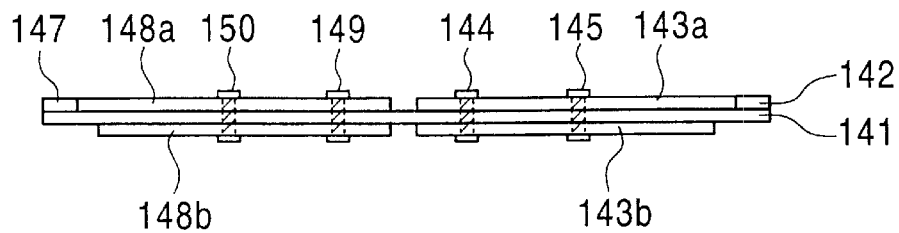

The lens driving apparatus 150' according to the fourth embodiment of the present invention features the configuration and the drive method of the aforementioned V-shaped drive coil 140. Now, the configuration of the V-shaped drive coil 140 is explained with reference to FIGS. 16A and 16B. Incidentally, FIG. 16A includes a view illustrating the front side of the V-shaped drive coil 140 (the upper view) and a perspective view illustrating the reverse side of the V-shaped drive coil 140 (the lower view). FIG. 16B is a cross-sectional view illustrating the V-shaped drive coil 140.

The V-shaped drive coil 140 is a pair of drive coils comprising drive coil A 143 and drive coil B 148, and is formed symmetrically with respect to a plane including an optical axis and perpendicular to the direction of tracking. For example, the drive coils A and B are formed in the same elliptical shape by patterning and etching on a double-sided copper laminated printed circuit board 141, made of glass epoxy or the like. The optical axis represents the trace of a beam passing through the objective lens 31 and is shown by line C in the figure. In addition, the drive coils A 143 and B 148 are arranged across the N- and S-pole surfaces of the V-shaped magnet 11 the two longer sides of which are split three-way to be magnetized. Accordingly, the drive coil A 143 is so formed as to allow the longer axis thereof to be inclined rightward substantially at 45 degrees relative to the optical axis. On the other hand, the drive coil B 148 is so formed as to allow the longer axis thereof to be inclined leftward substantially at 45 degrees relative to the optical axis.

As shown in FIG. 4B, the V-shaped drive coil 140 has a substantially elliptical first drive coil A 143a and a first drive coil B 148a formed symmetrically with respect to line C on a copper foil on the front side of the printed circuit board 141. A second drive coil A 143b and a second drive coil B 148b are formed in the same shape as those of the aforementioned ones at the same positions as those of the aforementioned ones on a copper foil on the reverse side. Then, the first focus coil 143a and the second drive coil A 143b are connected in series to each other via two through-holes 144, 145, forming the drive coil A 143. Moreover, the first drive coil B 148a and the second drive coil B 148b are connected in series to each other via two through-holes 149, 150, thus forming the drive coil B 148.

Incidentally, silver paste is injected into holes that penetrate the copper foils provided on the front and reverse side and then baked to form the aforementioned through-holes 144, 145, 149, 150. Alternatively, the inner sides of the holes that penetrate the copper foils provided on the front and reverse side are plated with copper to connect the copper foil on the front side to that on the reverse side. The double circles designate through-holes in the figures.

An input terminal A 142 formed on the outer rim portion on the front side of the printed circuit board 141 is connected to the first through-hole 144 via the pattern of the copper foil. The first through-hole 144 is in turn connected to the second drive coil A 143b formed on the reverse side. The second drive coil A 143b is formed in a spiral fashion from the outer to inner circumference in the counterclockwise direction and then connected to the second through-hole 145. The second through-hole 145 is connected to the first drive coil A 143a formed on the front side. The first drive coil A 143a is formed in a spiral fashion from the inner to outer circumference in the counterclockwise direction and then connected to an output terminal A 146. Therefore, the two drive coils A 143a, 143b are connected in series to each other in between the input terminal A 142 and the output terminal A 146.

An input terminal B 147 formed on the outer rim portion on the front side of the printed circuit board 141 is connected to the third through-hole 149 via the pattern of the copper foil. The third through-hole 149 is in turn connected to the second drive coil B 148b formed on the reverse side. The second drive coil B 148b is formed in a spiral fashion from the outer to inner circumference in the clockwise direction and then connected to the fourth through-hole 150. The fourth through-hole 150 is connected to the first drive coil B 148a formed on the front side. The first drive coil B 148a is formed in a spiral fashion from the inner to outer circumference in the clockwise direction and then connected to an output terminal B 151. Therefore, the two drive coils B 148a, 148b are connected in series to each other in between the input terminal B 147 and the output terminal B 151.

Figure 17:
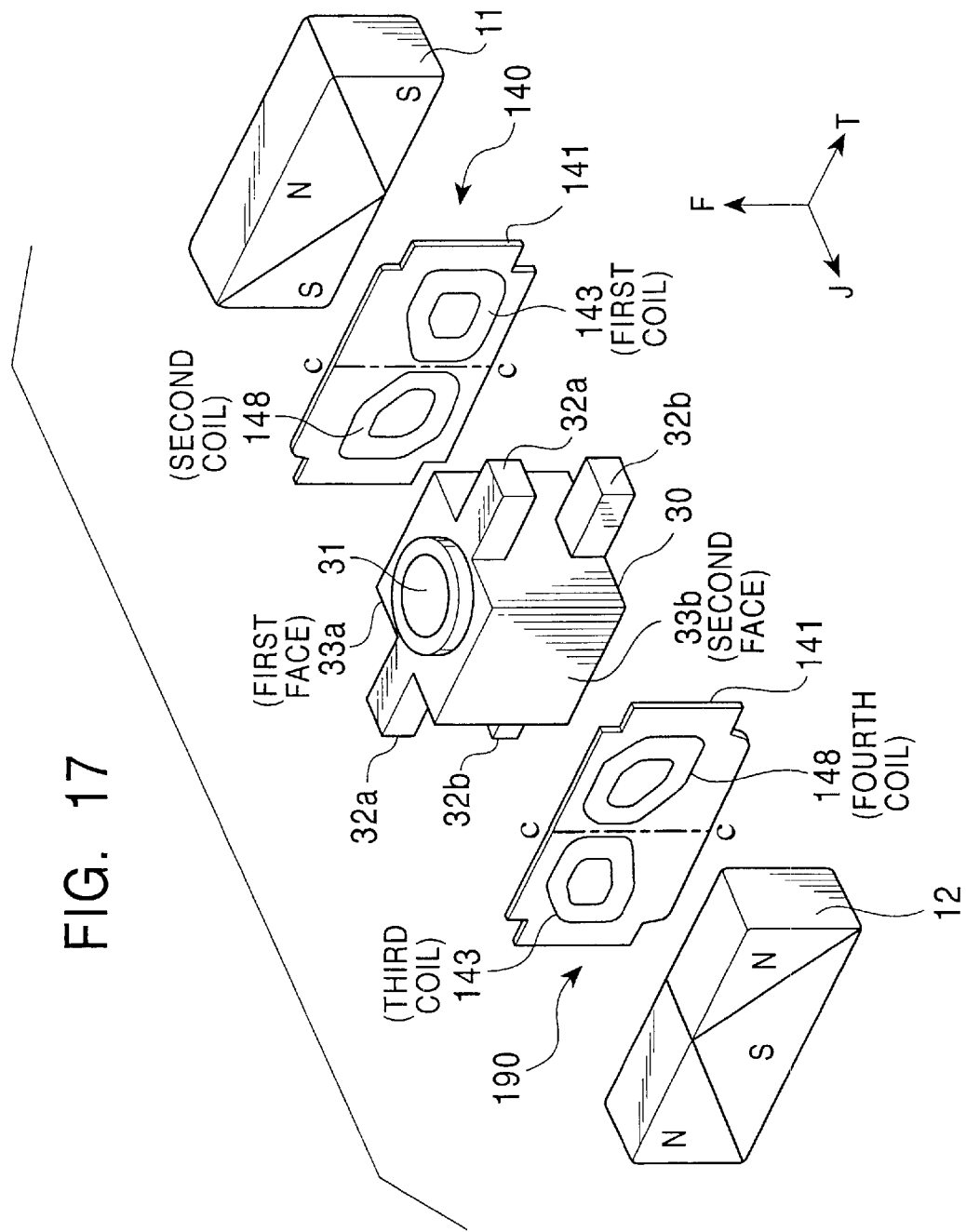
FIG. 17 is a schematic perspective view illustrating the positional relationship among those such as a V-shaped magnet and a V-shaped drive coil.

Next, the positional relationships between the V-shaped drive coil 140 and the V-shaped magnet 11, and between the inverted V-shaped drive coil 190 and the inverted V-shaped magnet 12 are explained with reference to FIG. 17.

The V-shaped drive coil 140 is fixed to one side (a first side) 33a of the lens holder 30, the first side being perpendicular to the direction of jitter, and is arranged opposite to the V-shaped magnet 11 or magnetic flux imparting means with a predetermined magnetic gap interposed therebetween. The drive coil A (first coil) 143 and drive coil B (second coil) 148, which constitute the V-shaped drive coil 140, are plane coils which are provided on the same printed circuit board 141, parallel to a plane perpendicular to the direction of jitter. Magnetic fluxes are imparted to the drive force generating portions of the drive coil A 143 and the drive coil B 148 by means of the V-shaped magnet 11.

On the other hand, the inverted V-shaped drive coil 190 is the V-shaped drive coil 140 that is rotated by 180 degrees, and fixed to the other side (the second side) 33b of the lens holder 30, the second side being perpendicular to the direction of jitter. The drive coil A (third coil). 143 and the drive coil B (fourth coil) 148, which constitute the inverted V-shaped drive coil 190, are arranged opposite to the inverted V-shaped magnet 12 with a predetermined magnetic gap interposed therebetween. Thus, the drive coil A (first coil) 143 of the V-shaped drive coil 140 and the drive coil B (fourth coil) 148 of the inverted V-shaped drive coil 190 are arranged opposite to each other via the lens holder 30. The drive coil B (second coil) 148 of the V-shaped drive coil 140 and the drive coil A (third coil) 143 of the inverted V-shaped drive coil 190 are also arranged opposite to each other via the lens holder 30. Moreover, the drive coil A 143 of the V-shaped drive coil 140 and that of the inverted V-shaped drive coil 190 are connected in series to each other. In addition, the drive coil B 148 of the V-shaped drive coil 140 and that of the inverted V-shaped drive coil 190 are connected in series to each other.

The terminals of each of the windings are connected such as by soldering to the connection portions 22b of the support wires 21 that are adhered to the four holder potions 32a, 32b of the lens holder 30. In addition, the withdrawal portions 22a, of the support wires 21 are connected with litz wires (not shown). The V-shaped drive coil 140 and the inverted V-shaped drive coil 190 are supplied externally from a drive circuit 170, described later, with a focus drive current or a focus error compensation signal and an additional current of tracking drive current or a tracking error compensation signal. Alternatively, the drive coils 140 and 190 are supplied with a differential current between the focus drive current and the tracking drive current. Consider a case where an additional current is supplied to the first coil of the V-shaped drive coil 140 and a differential current to the second coil. In this case, the additional current is supplied to the third coil opposite to the first coil and the differential current to the third coil opposite to the second coil.

Consider a case where the aforementioned drive currents are supplied to the V-shaped drive coil 140 and the inverted V-shaped drive coil 190 via the support wires 21. In this case, the movable portion 100 is displaced freely in the directions of tracking and focus within the magnetic gap in response to the drive currents.

Next, the drive method of the V-shaped drive coil 140 is explained with reference to FIG. 18.

Figure 18:
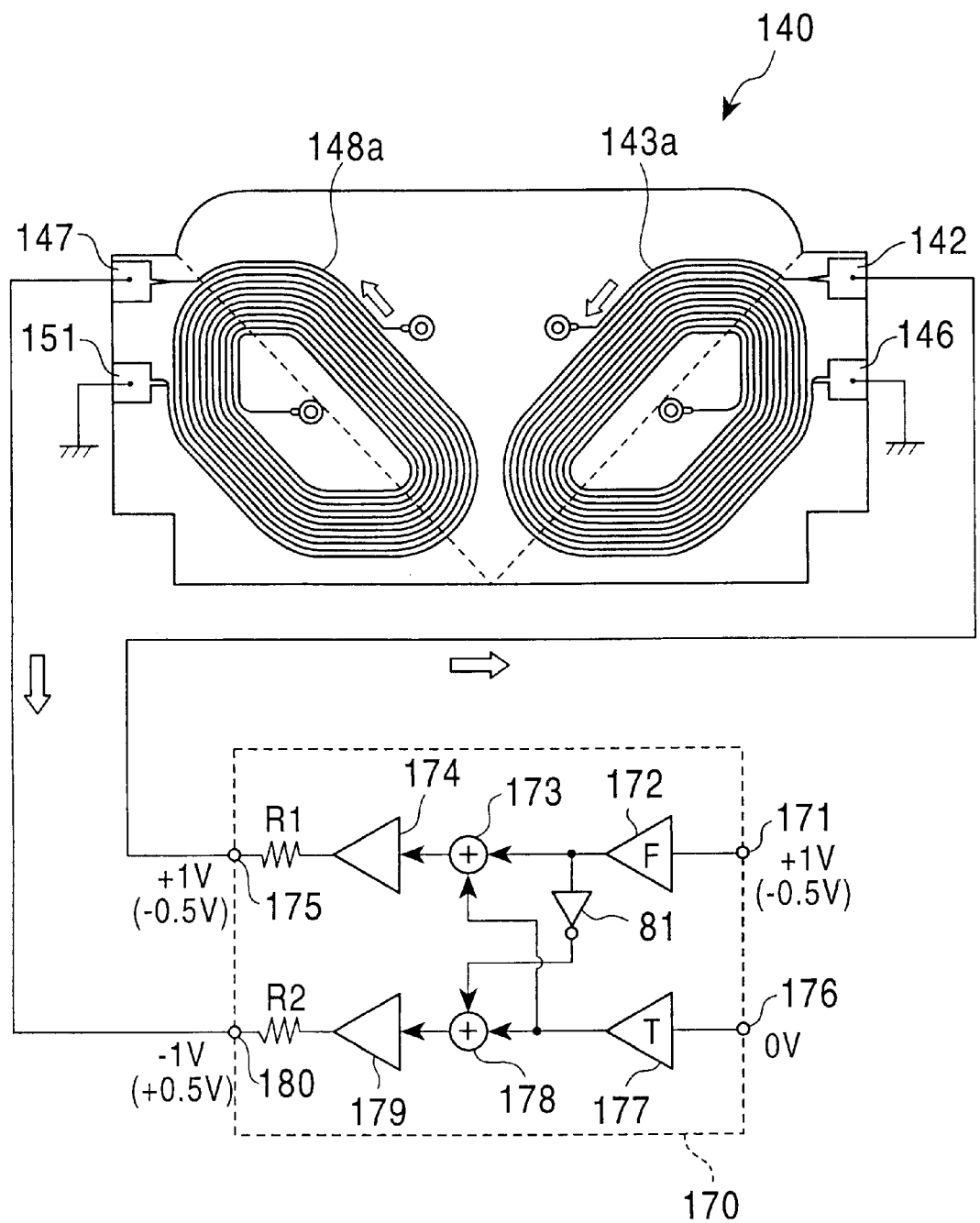
FIG. 18 is an explanatory view illustrating the drive method of a V-shaped drive coil.

Incidentally, FIG. 18 includes a plan view illustrating the V-shaped drive coil 140 (the upper view) and a view illustrating the drive circuit 170 (the lower view). The inverted V-shaped drive coil 90 is not shown in the figure.

The drive circuit 170 generates and outputs an additional or a differential signal between the focus and tracking error compensation signal or a dc voltage which varies between plus and minus and is supplied from a focus and tracking servo circuit (not shown).

The drive circuit 170 comprises input buffers A 172, B 177, two adders 173, 178, output buffers A 174, B 179, and an inverter 181. A drive terminal A 175 is connected to the input terminal A 142 of the V-shaped drive coil 140, while a drive terminal B 180 is connected to the input terminal B 147 of the V-shaped drive coil 140. In addition, a drive terminal 146 and a drive terminal B 151 are connected to the ground potential.

The focus error compensation signal supplied to a focus terminal 171 is supplied to the inverter 181 and the adder 173, via the input buffer A 172. The adder 173 adds the focus error compensation signal and the tracking error compensation signal outputted from the input buffer B 177 to output the resulting signal as drive signal A from the drive terminal A 175 via the output buffer A 174 and resistor R1. This means that the drive signal A is an additional current of the focus error compensation signal and the tracking error compensation signal.

The tracking error compensation signal supplied to a tracking terminal 176 is supplied to the adder 178 via the input buffer B 177. The adder 178 adds the tracking error compensation signal and the focus error compensation signal the polarity of which is inverted at the inverter 181 to output the resulting signal as drive signal B from the drive terminal B 180 via the output buffer B 179 and resistor R2. This means that the drive signal B is a differential current between the focus error compensation signal and the tracking error compensation signal.

The operation of the V-shaped drive coil 140 is explained by taking as an example the case where a focus error compensation signal of +1V is supplied to the focus terminal 171 and a tracking error compensation signal of 0V is supplied to the tracking terminal 176.

The focus error compensation signal is supplied, via the input buffer A 172, to the inverter 181 and the adder 173. Since the tracking error compensation signal is 0V, the adder 173 outputs the focus error compensation signal, that is, +1V as the drive signal A. The adder 178 outputs −1V as the drive signal B since the aforementioned inverter 181 has inverted the polarity of the tracking error compensation signal to −1V and the resulting signal is supplied to the adder 178 although the tracking error compensation signal is 0V. The drive signal A of +1V is supplied to the input terminal A 142 and the output terminal A 146 is connected to the ground potential. Therefore, the drive coil A 143 of the V-shaped drive coil 140 allows a drive current to flow therethrough in the direction (shown by the arrows) from the input terminal A 142 to the output terminal A 146.

Moreover, the drive signal B of −1V is supplied to the input terminal B 147 and the output terminal B 151 is connected to the ground potential. Therefore, the drive coil B 148 of the V-shaped drive coil 140 allows a drive current in the direction from the output terminal B 151 to the input terminal B 147. These drive currents are supplied in either direction of focus or tracking as an inclined current.

Consider the case where a focus error compensation signal of such as of −0.5V is supplied to the focus terminal 171 as shown in parentheses in the figure and a tracking error compensation signal of 0V is supplied to the tracking terminal 176. In this case, the drive signal A is −0.5V and the drive signal B is +5V. Therefore, the drive current supplied to the drive coil A 143 and the drive coil B 148 is different in magnitude from and opposite in direction to the aforementioned case. This means that the drive circuit 170 determines, for the V-shaped drive coil 140, the magnitude and direction of the drive current corresponding to the magnitude and polarity of the focus and tracking error compensation signals.

Next, how the plane coils are driven is explained with reference to FIGS. 19A to 19E. Incidentally, FIGS. 19A to 19E are schematic explanatory views illustrating drive coils 158a, 158b arranged opposite to the V-shaped magnet 11. FIG. 19A is a plan view illustrating a case where, for example, a pair of square drive coils 158a, 158b are employed. FIG. 19B is a vector diagram showing a partial drive force of the left drive coil 158b, while FIG. 19C is a vector diagram showing a partial drive force of the right drive coil 158a. FIG. 19D is a vector diagram showing a total drive force. FIG. 19E is a plan view illustrating a case where, for example, a pair of circular drive coils 159a, 159b are employed.

Incidentally, the circles each having a dot therein denote a magnetic flux penetrating from the reverse to front side of the drawing, whereas the circles each having a cross therein denote a magnetic flux penetrating from the front to reverse side of the drawing. In addition, the arrows inside the drive coils 158a, 158b, 159a, 159b denote the direction of the currents flowing through the drive coils 158a, 158b, 159a, 159b, while the blank arrows in the figure denote partial drive forces of the drive coils 158a, 158b, 159a, 159b.

As described above, the V-shaped magnet 11 or magnetic flux imparting means is a three-way split multi-pole magnet that is formed in a square shape by a right-angled triangle magnet and two right-angled triangle magnets. The both poles of the magnets are magnetized. The V-shaped magnet 11 is adapted to have the N-pole surface arranged in the shape of a letter V at the center thereof and the S-pole surfaces arranged on the right and left of the N-pole surface. Thus, the boundary lines (referred to as imaginary lines L) between the N-pole surface at the center and the S-pole surfaces on the right and left are so arranged as to be rotated 45 degrees in the clockwise and counterclockwise direction relative to the optical axis, respectively. Moreover, as shown in FIG. 19A, the drive coils 158a, 158b are adapted to allow diagonal lines thereof to be laid on the aforementioned imaginary straight lines L of the squares. This means that regions SI of the drive coils 158a, 158b for receiving the magnetic flux from the N-pole of the V-shaped magnet 11 are equal to the other regions S2 of the drive coils 158a, 158b for receiving the magnetic flux from the S-pole of the V-shaped magnet 11. Thus, in the regions S1, S2 split with the imaginary lines L, the drive coils 158a, 158b are provided with magnetic fluxes, opposite in direction to each other, in the direction of jitter. In addition, the pair of the square drive coils 158a, 158b is arranged to be symmetrical with respect to the optical axis.

For example, one region S1 of the drive coil 158a located on the right is provided with a magnetic flux penetrating from the reverse to front side of the drawing by means of the N-pole surface. Supplying a current to the drive coil 158a in the direction shown by the arrows will cause a partial drive force to be generated vertically upward at portion A of the drive coil 158a and horizontally leftward at portion B. Moreover, the other region S2 of the drive coil 158a is provided with a magnetic flux penetrating from the front to reverse side of the drawing by means of the S-pole surface. Thus, supplying a current to the drive coil 158a in the direction shown by the arrows will cause a partial drive force to be generated vertically upward at portion C of the drive coil 158a and horizontally leftward at portion D of the drive coil 158a. Therefore, as shown in FIG. 19C, the drive coil 158a allows the partial drive forces produced vertically upward at portions A, C and the partial drive forces produced horizontally leftward at portions B, D to be added to yield a resultant coil drive force directed at 45 degrees to the upward. (In the drawing, the arrow with transverse lines designates the coil drive force). That is, a drive force is generated which is directed vertically leftward relative to the imaginary straight line L.

In addition, one region S1 of the drive coil 158b located on the left sits on the N-pole surface. Consequently, supplying a current to the drive coil 158b in the same direction as that of the current flowing through the drive coil 158a located on the right will cause a partial drive force to be generated vertically upward at portion A and horizontally rightward at portion D. Furthermore, the other region S2 of the drive coil 158b is located on the S-pole surface. Consequently, a partial drive force is generated horizontally rightward at portion B of the drive coil 158b and vertically upward at portion C. Therefore, as shown in FIG. 19B, the drive coil 158b located on the left allows the partial drive forces produced vertically upward at portions A, C and horizontally rightward at portions B, D to be added to yield a resultant coil drive force directed at 45 degrees to the right upward. Accordingly, as shown in FIG. 19D, the drive forces of a pair of the square drive coils 158a, 158b, one on the right and the other on the left, are added to yield a resultant drive force (shown by the shaded arrow) directed vertically upward or in the direction of focus.

Furthermore, as shown in FIG. 19E, the circular drive coils 159a, 159b have centerlines thereof located on the imaginary lines L. Thus, regions S3 of the drive coils 159a, 159b for receiving the magnetic flux from the N-pole surface of the V-shaped magnet 11 are equal to the other regions S4 of the drive coils 159a, 159b for receiving the magnetic flux from the S-pole surface of the V-shaped magnet 11.

The drive coils 159a, 159b generate driving forces radially from portions E, F, however, the partial drive forces at around the imaginary lines L are equal in magnitude but opposite in direction to each other, thus being canceled out. For example, like in the foregoing, the drive coil 159a located on the right generates a drive force directed at 45 degrees to the left upward, whereas the drive coil 159b located on the left generates a drive force directed at 45 degrees to the right upward. Accordingly, as shown in FIG. 19D, the drive forces of a pair of the circular drive coils 159a, 159b, one on the right and the other on the left, are added to yield a resultant drive force directed vertically upward or in the direction of focus.

As described above, the drive coils 158a, 158b are located on the imaginary lines L of the V-shaped magnet 11 in a manner such that the areas of the two regions S1, S2 are equal to each other. In addition, the regions S1 and the other regions S2 are provided with magnetic fluxes that are opposite in direction to each other, whereby the drive coils 158a, 158b are driven accurately in the direction of focus. Moreover, the pair of drive coils 158a, 158b can obtain a total drive force in the direction of tracking when currents are supplied thereto which are opposite in direction to each other. That is, the drive coils 158a, 158b are not limited to a particular shape. However, this means that if the drive coils 158a, 158b are each symmetrical with respect to the imaginary straight line L and the areas of the two regions S1, S2 are equal to each other, accurate focus or tracking drive forces can be obtained when the partial drive forces generated at the right and left drive coils 158a, 158b are added.

Figure 20A:
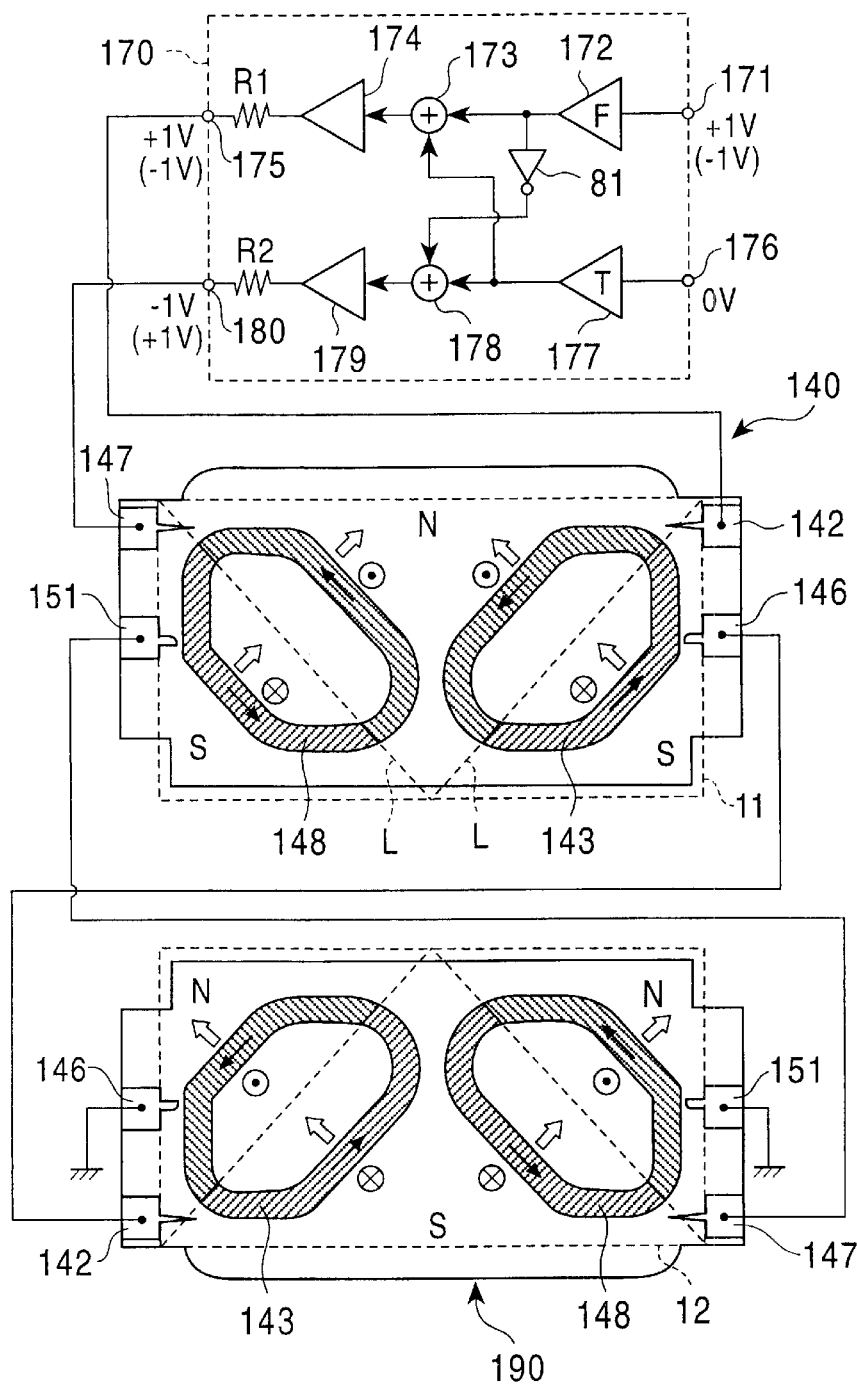
FIGS. 20A and 20B are explanatory views illustrating the operation for allowing the resultant drive force of a V-shaped drive coil and an inverted V-shaped drive coil to be oriented in the direction of focus.
Figure 20B:
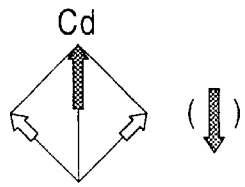
Figure 21A:
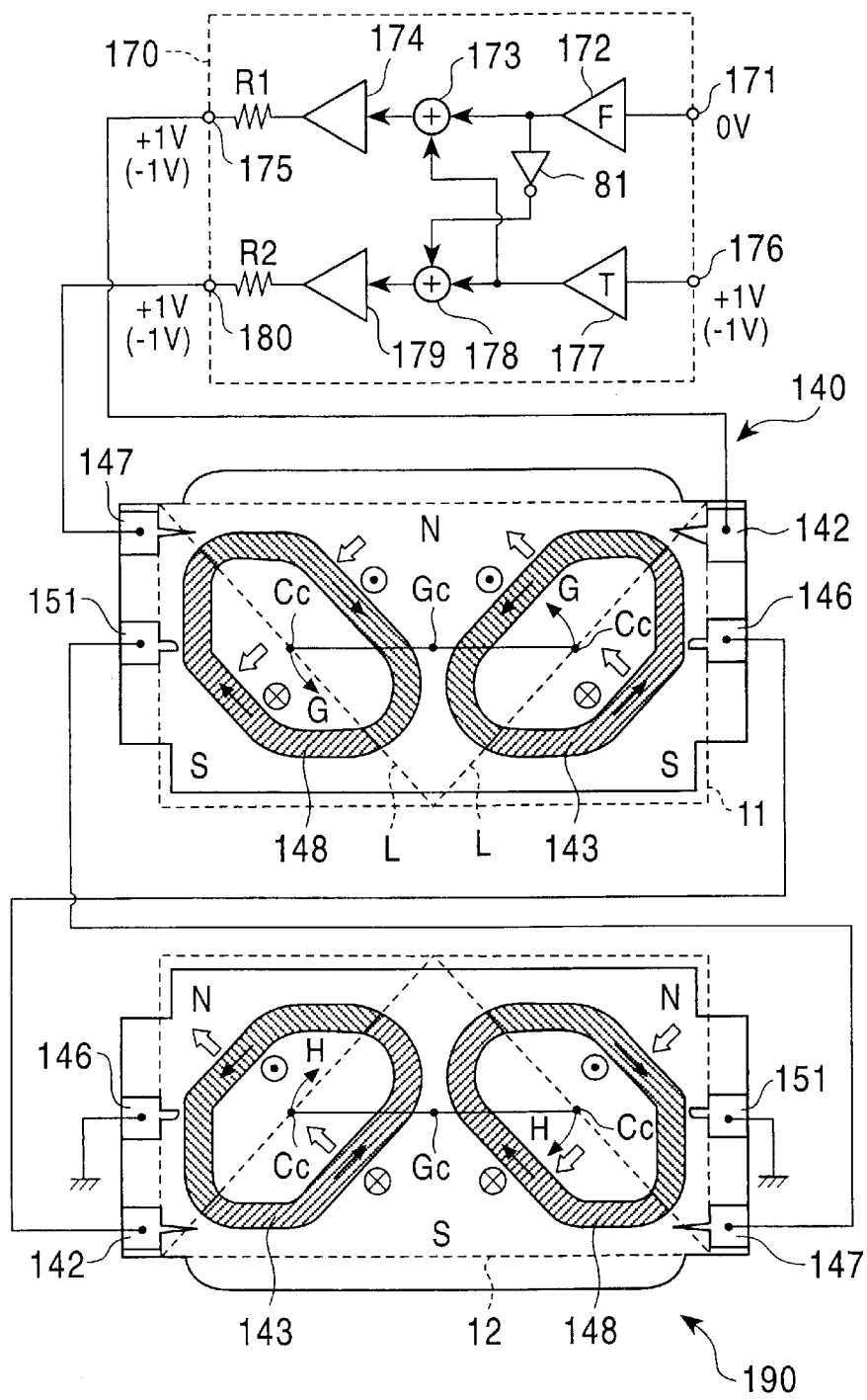
FIGS. 21A and 21B are explanatory views illustrating the operation for allowing the resultant drive force of a V-shaped drive coil and an inverted V-shaped drive coil to be oriented in the direction of tracking.
Figure 21B:
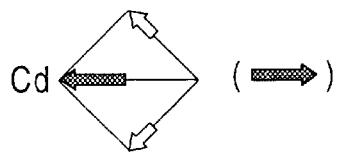

Next, the operation of the focus drive coil 140 and the inverted V-shaped drive coil 190 is explained with reference to FIGS. 20A, 20B, to 22A, and 22B. Incidentally, FIGS. 20A, 20B, to 22A, and 22B are operational explanatory views illustrating the V-shaped drive coil 140 and the inverted V-shaped drive coil 190, schematically shown and connected in series to each other, when driven by means of the drive circuit 170. FIGS. 20A and 20B are operational explanatory views illustrating a case where a total drive force, described later, is directed to the direction of focus. FIGS. 21A and 21B are operational explanatory views illustrating a case where a total drive force is directed to the direction of tracking. FIGS. 22A and 22B are operational explanatory views illustrating a case where a total drive force is directed at an angle of 60 degrees to the left upward. In FIGS. 20A, 21A, and 22A, the upper view illustrates the drive circuit 170, the middle plan view illustrating the V-shaped drive coil 140, and the lower plan view illustrating the inverted V-shaped drive coil 190, while FIGS. 19B, 20B, 21B illustrate a total drive force Cd. In addition, in FIGS. 20A, 20B, 21A, and 21B, to make the operation clear, explanations will be made with the focus and tracking error compensation signals being fixed to 0V or +/−1V.

First, how the V-shaped drive coil 140 and the inverted V-shaped drive coil 190 obtain a drive force in the direction of tracking is explained with reference to FIGS. 20A and 20B.

As shown in the upper view of FIG. 20A, for example, +1V is supplied to the focus terminal 171 as a focus error compensation signal and 0V to the tracking terminal 176 as a tracking error compensation signal. In this case, a drive signal A of +1V is outputted from the drive terminal A 175 and a drive signal B of −1V from the drive terminal B 180.

As shown in the middle view of FIG. 20A, the drive terminal A 175 of the drive circuit 170 is connected to the input terminal A 142 of the V-shaped drive coil 140, arranged opposite to the V-shaped magnet 11. On the other hand, as shown in the lower view of FIG. 20A, the output terminal A 146 of the focus drive coil 40 is connected to the input terminal A 142 of the inverted V-shaped drive coil 190, arranged opposite to the inverted V-shaped magnet 12. The output terminal A 146 of the inverted V-shaped drive coil 190 is connected to the ground potential. Thus, currents flow through the drive coils A 143 of the V-shaped drive coil 140 and the inverted V-shaped drive coil 190 in the directions shown in the figure (by the arrows inside the drive coils A 143).

On the other hand, the drive terminal B 180 is connected to the input terminal B 147 of the V-shaped drive coil 140. The output terminal B 151 of the V-shaped drive coil 140 is connected to the input terminal B 147 of the inverted V-shaped drive coil 190, arranged opposite to the inverted V-shaped magnet 12. The output terminal B 151 of the inverted V-shaped drive coil 190 is connected to the ground potential. Thus, currents flow through the drive coils B 148 of the V-shaped drive coil 140 and the inverted V-shaped drive coil 190 in the directions shown in the figure (by the arrows inside the drive coils B 148).

The drive coils A 143 and B 148 constituting the V-shaped drive coil 140 and the inverted V-shaped drive coil 190 are arranged in a manner such that the longer sides thereof sit across the N- and S-pole surfaces, forming a pair of drive force generating portions. The drive force generating portions of the drive coils A 143 and B 148 allow a drive current to flow through in an inclined direction relative to any one of the directions of focus and tracking. Accordingly, the V-shaped magnet 11 and the inverted V-shaped magnet 12 supply magnetic fluxes, opposite in direction to each other in the direction of jitter, to the drive force generating portions. That is, consider a case where the drive coil A 143 of the V-shaped drive coil 140 is supplied with a drive current in the direction shown in the figure and imparted with a magnetic flux in the direction shown in the figure by means of the V-shaped magnet 11. In this case, drive force A is generated at 45 degrees to the left upward relative to the optical axis (shown by the blank arrows). In addition, the drive coil B 148 of the V-shaped drive coil 140 is supplied with a drive current opposite in direction to the one flowing through the drive coil A 143, thereby generating drive force B at 45 degrees to the left upward relative to the optical axis. Therefore, as shown in FIG. 20B, the drive forces produced by the drive coils A 143 and B 148 of the V-shaped drive coil 140 in the direction of focus are added to yield the resultant drive force Cd (shown by the shaded arrow) directed upward relative to the optical axis.

In addition, consider the case where the drive coil A 143 of the inverted V-shaped drive coil 190 is supplied with a drive current in the direction shown in the figure and imparted a magnetic flux in the direction shown in the figure from the inverted V-shaped magnet 12. In this case, the drive coil A 143 generates the drive force A at 45 degrees to the left upward relative to the optical axis. Moreover, the drive coil B 148 of the inverted V-shaped drive coil 190 is supplied with a drive current opposite in direction to the one flowing through the drive coil A 143. Accordingly, the drive coil B 148 generates the drive force B at 45 degrees to the right upward relative to the optical axis.

Therefore, as shown in FIG. 20B, the drive forces produced in the direction of focus in the drive coils A 143 and B 148 of the inverted V-shaped drive coil 190 are added to yield the resultant drive force Cd (shown by the shaded arrow) directed upward relative to the optical axis.

Suppose that the drive forces A, B generated by the drive coils A 143 and B 148 are proportional to the drive signals A, B supplied from the drive circuit 170. In this case, the drive forces A, B are both equal to "1". Moreover, the drive forces A, B are each arranged at 45 degrees relative to the optical axis. This makes the total drive force Cd produced by the drive forces A, B equal to $2^{1/2}$ times the drive forces A and B.

Next, for example, as shown with the values in the parentheses of FIG. 20A, consider a case where −1V is supplied as a focus error compensation signal to the focus terminal 171 and 0V as a tracking error compensation signal to the tracking terminal 176. In this case, the drive terminal A 175 outputs a drive signal A of −1V, while the drive terminal B 180 outputs a drive signal B of +1V. This causes a current to flow in the direction opposite to that shown in the figure through the drive coils A 143 of the V-shaped drive coil 140 and the inverted V-shaped drive coil 190. This also causes a current to flow in the direction opposite to that shown in the figure through the drive coils B 148 of the V-shaped drive coil 140 and the inverted V-shaped drive coil 190. Accordingly, this in turn causes a drive force to be generated in the direction opposite to that shown in the figure in the drive coils A 143 and B 148 of the V-shaped drive coil 140. This also causes a drive force to be generated in the direction opposite to that shown in the figure in the drive coils A 143 and B 148 of the inverted V-shaped drive coil 190. Therefore, as shown in FIG. 20B, the drive forces in the direction of focus of the drive coils A 143 and B 148 are added to yield the resultant drive force Cd directed downward relative to the optical axis (shown by the parentheses).

Next, with reference to FIGS. 21A and 21B, explained is the operation for the V-shaped drive coil 140 and the inverted V-shaped drive coil 190 to obtain a drive force in the direction of tracking.

For example, as shown in the upper view of FIG. 21, consider a case where 0V is supplied as a focus error compensation signal to the focus terminal 171 and +1V is supplied as a tracking error compensation signal to the tracking terminal 176. In this case, the drive terminal A 175 outputs a drive signal A of +1V and the drive terminal B 180 outputs a drive signal B of +1V.

As described with reference to FIGS. 20A and 20B, a current flows through the drive coils A 143 and B 148 of the V-shaped drive coil 140 and the inverted V-shaped drive coil 190 in the direction shown in the figure. A magnetic flux imparted by the V-shaped magnet 11 and the inverted V-shaped magnet 12 in the direction shown causes the drive coil A 143 of the V-shaped drive coil 140 to generate a drive force A at 45 degrees to the left upward relative to the optical axis.

In addition, the drive coil B 148 of the V-shaped drive coil 140 is supplied with a drive current in the direction opposite to that of the current of the drive coil A 143. Thus, a drive force B is generated at 45 degrees to the left downward relative to the optical axis. Accordingly, the drive forces, directed in the direction of tracking, of the drive coils A 143 and B 148 are added to yield a resultant drive force Cd directed to the left relative to the optical axis as shown in FIG. 20B.

Likewise, the drive coil A 143 of the inverted V-shaped drive coil 190 generates a drive force A at 45 degrees to the left upward relative to the optical axis. On the other hand, the drive coil B 148 generates a drive force B at 45 degrees to the left downward relative to the optical axis. Accordingly, the drive forces, directed in the direction of tracking, of the drive coils A 143 and B 148 of the inverted V-shaped drive coil 190 are added to yield a resultant drive force Cd directed to the left relative to the optical axis as shown in FIG. 20B. Moreover, like in the foregoing, this makes the total drive force Cd produced by the drive forces A, B equal to $2^{1/2}$ times the drive forces A and B.

Next, as shown with the values in the parentheses of FIG. 21A, for example, consider a case where 0V is supplied as a focus error compensation signal to the focus terminal 171 and −1V is supplied to as a tracking error compensation signal to the tracking terminal 176. In this case, the drive terminal A 175 outputs a drive signal A of −1V and the drive terminal B 180 outputs a drive signal B of −1V.

Therefore, the drive coils A 143 and B 148 of the V-shaped drive coil 140 generate a drive force in the direction opposite to that shown in the figure. Likewise, the drive coils A 143 and B 148 of the inverted V-shaped drive coil 190 generate a drive force in the direction opposite to that shown in the figure. Accordingly, the drive forces, directed in the direction of tracking, of the drive coils A 143 and B 148 are added to yield a resultant drive force Cd directed to the right relative to the optical axis as shown (by the parentheses) in FIG. 21B.

As described above, the drive coils A 143 and B 148 of the V-shaped drive coil 140 are formed symmetrically with respect to the line or the optical axis. Thus, the center of gravity (Gc) of the V-shaped drive coil 140 sits generally at the center of the printed circuit board 141. Moreover, the center of gravity (Gc) of the drive coils A 143 and B 148 sits generally at the center of the drive coils A 143 and B 148. Consider the case where the drive coil A 143 of the V-shaped drive coil 140 generates a drive force at 45 degrees to the left upward and the drive coil B 148 generate a drive force at 45 degrees to the left downward, relative to the optical axis. In this case, as shown in the middle view of FIG. 21A, the V-shaped drive coil 140 generates a rotational drive force in the counterclockwise direction (shown by arrows G) about the center of gravity (Gc) of the printed circuit board 141.

Moreover, as shown in the lower view of FIG. 21A, for the inverted V-shaped drive coil 190, the drive coil A 143 generates a drive force at 45 degrees upward relative to the optical axis and the drive coil B 148 generates at 45 degrees downward relative to the optical axis. This causes the inverted V-shaped drive coil 190 to generate a rotational drive force in the clockwise direction (shown by arrows H) about the center of gravity (Gc) of the printed circuit board 141.

For example, consider the case where the V-shaped drive coil 140 generates a rotational drive force in the counterclockwise direction and the inverted V-shaped drive coil 190 generates a rotational drive force in the counterclockwise direction. Thus, in this case, the rotational drive forces cancel out each other, resulting in no rotational force generated in the movable portion 100 in neither clockwise nor counterclockwise direction. That is, the lens driving apparatus 150' of the present invention comprises the inverted V-shaped drive coil 190 or the V-shaped drive coil 140 rotated by 180 degrees and the inverted V-shaped magnet 12 to cancel out the rotational drive force generated in the V-shaped drive coil 140.

Figure 22:
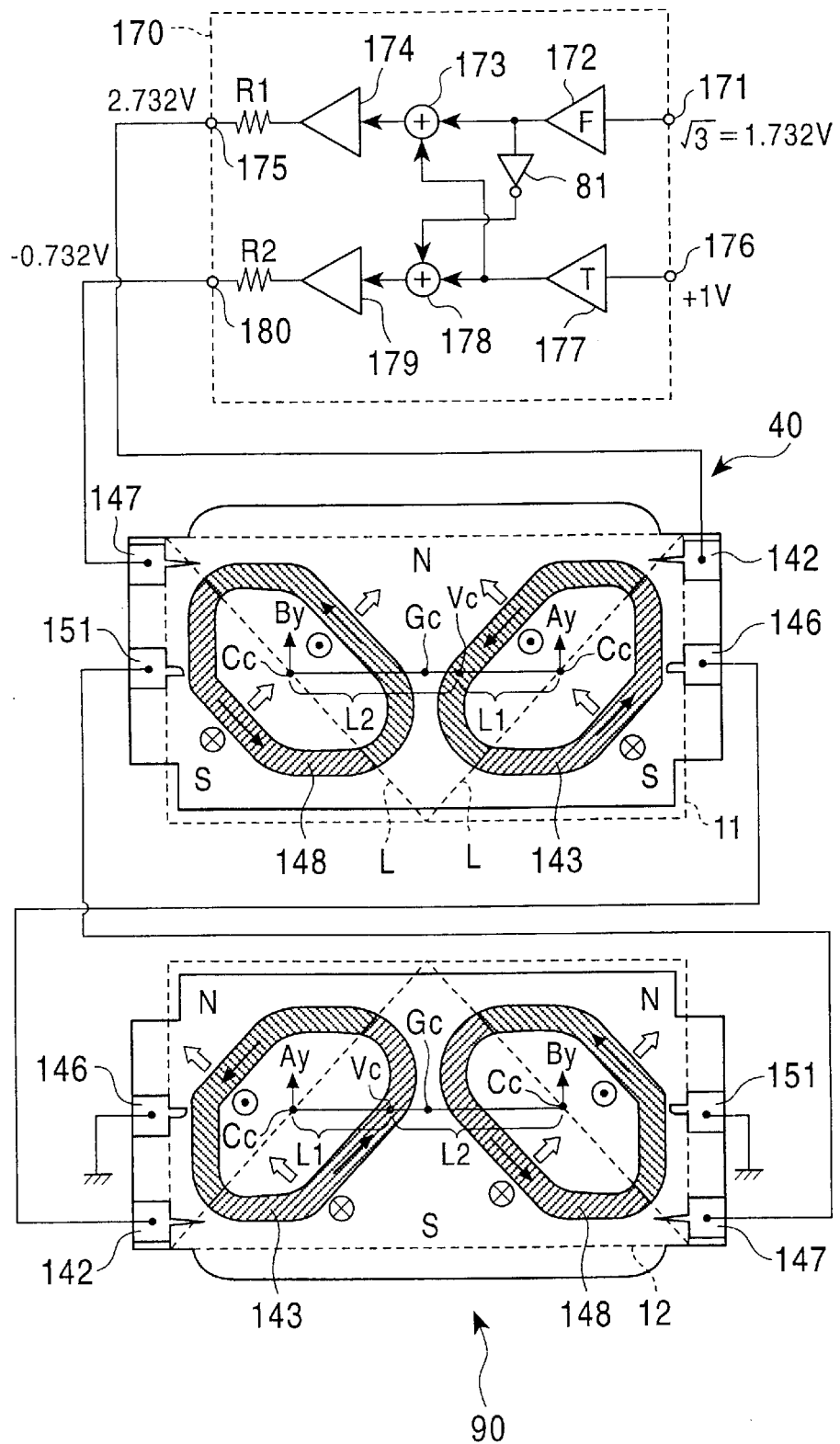
FIG. 22 is an explanatory view illustrating the operation for allowing the resultant drive force of a V-shaped drive coil and an inverted V-shaped drive coil to be oriented at an angle of 60 degrees upward to the left.
Figure 23:
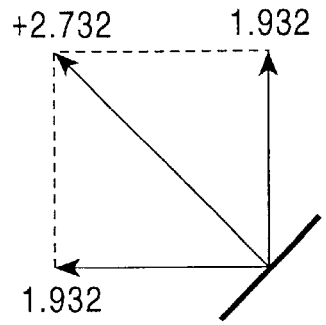
FIGS. 23 to 25 are views illustrating the vectors of the drive forces shown in FIG. 22.
Figure 24:
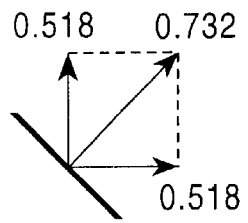
Figure 25:
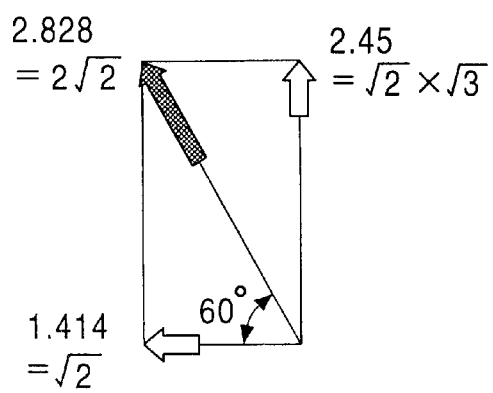

Next, with reference to FIGS. 22 and 23 to 25, explained is the operation in which the V-shaped drive coil 140 is displaced, for example, at 60 degrees to the left upward. Incidentally, for example, FIG. 22 illustrates a case where a focus error compensation signal of 1.732V and a tracking error compensation signal of +1V are supplied, based on the trigonometric relation of a right-angled triangle having an angle of 60 degrees. Moreover, FIGS. 23 to 25 illustrate vector diagrams of the focus drive coil 40. FIG. 23 illustrates a drive force A of the drive coil A 143; FIG. 24 illustrates a drive force B of the drive coil B 148; and FIG. 15 illustrates a total drive force Cd.

As shown in the upper view of FIG. 22, suppose that a focus error compensation signal of 1.732V is supplied to the focus terminal 171 and a tracking error compensation signal of +1V is supplied to the tracking terminal 176. In this case, the drive terminal A 175 outputs a drive signal A of 2.732V and the drive terminal B 180 outputs a drive signal B of −0.732V.

The drive signal A of 2.732V supplied from the drive terminal A 175 causes a current to flow in the direction shown in the figure through the drive coil A 143 of the V-shaped drive coil 140 and the inverted V-shaped drive coil 190. A magnetic flux imparted from the V-shaped and inverted V-shaped magnets 11, 12 in the direction shown in the figure causes the drive coils A 143 to generate a drive force A (2.732) at 45 degrees to the left upward relative to the optical axis as shown in FIG. 23. Likewise, the drive signal B of −0.732V supplied from the drive terminal B 180 causes a current to flow in the direction shown in the figure through the drive coil B 148 of the V-shaped drive coil 140 and the inverted V-shaped drive coil 190. A magnetic flux imparted from the V-shaped and inverted V-shaped magnets 11, 12 in the direction shown in the figure causes the drive coils B 148 to generate a drive force B (0.732) at 45 degrees to the right upward relative to the optical axis as shown in FIG. 24.

The drive force A (2.732) is resolved into a vector (1.932) in the direction of the X- and Y-axis. Likewise, the drive force B (0.732) is resolved into a vector (0.518) in the X- and Y-axis. The resultant vector of the drive forces A and B in the direction of the respective X- and Y-axes is 1.414 along the X-axis and 2.45 along the Y-axis, as shown in FIG. 25.

Thus, obtained is the resultant drive force Cd 2.828. In addition, the angle e of the resultant drive force Cd is given as $\theta = \tan^{-1}(x/y) = 60°$.

That is, the V-shaped drive coil 140 and the inverted V-shaped drive coil 190 provides the resultant drive force Cd for displacement at 60 degrees to the left upward, respectively. Each resultant drive force is $2^{1/2}$ times the drive force A and B.

As described above, the rotational drive force caused by the drive force generated in the V-shaped drive coil 140 in the direction of tracking is canceled out by the rotational drive force in the inverted V-shaped drive coil 190. However, for example, a drive current supplied at 60 degrees to the left upward to the V-shaped drive coil 140 causes a rotational drive force to be generated likewise. That is, the drive coil A 143 of the V-shaped drive coil 140 and the inverted V-shaped drive coil 190 generates the drive force A (2.732) at 45 degrees to the left upward relative to the optical axis, while a drive force Ay in the Y-direction is 1.932. Moreover, the drive coil B 148 of the V-shaped drive coil 140 and the inverted V-shaped drive coil 190 generates the drive force B (0.732) at 45 degrees to the right upward relative to the optical axis, while a drive force By in the Y-direction is 0.518. Thus, the drive coils A 143 and B 148 of the V-shaped drive coil 140 generate drive forces Ay and By in the direction of the Y-axis, respectively, with different magnitudes. Therefore, this causes a rotational drive force to be generated not about the center of gravity (Gc) of the printed circuit board 141 but about the center of vector (Vc) that is fixed by the proportion of the two drive forces Ay and By.

This means that the ratio of a distance (L1) between the center of gravity (Gc) of the drive coil A 143 and the center of vector (Vc) to a distance (L2) between the center of gravity (Gc) of the drive coil B 148 and the center of vector (Vc) is equal to the inverse of the ratio between the two drive forces Ay and By. In addition, the center of vector (Vc) of the V-shaped drive coil 140 is opposite to the center of vector (Vc) of the inverted V-shaped drive coil 190 with respect to the optical axis. This causes the rotational drive forces to cancel out each other, resulting in no rotational force in the movable portion 100.

As described above, the V-shaped drive coil 140 for use in the lens driving apparatus 150' according to the fourth embodiment of the present invention is formed as follows. That is, a pair of generally elliptical drive coils are arranged symmetrically with respect to the optical axis, the drive coils comprising the drive coil A 143 and the drive coil B 148, each arranged at an angle of 45 degrees on the printed circuit board 141. Moreover, the pair is arranged in a plane perpendicular to the direction of jitter. This makes it possible to form the V-shaped drive coil 140 in the generally same size as the outer dimensions of the V-shaped magnet 11 that is arranged in an opposite position. This also makes it possible to impart efficiently the magnetic flux of the V-shaped magnet 11 to the drive coil A 143 and the drive coil B 148, which constitute the V-shaped drive coil 140.

Incidentally, the drive coil A 143 and the drive coil B 148 which constitute the V-shaped drive coil 140 used in the lens driving apparatus 150' of the present invention are inclined by 45 degrees relative to the optical axis. However, the angle of inclination is not limited to a particular angle.

Figure 26:
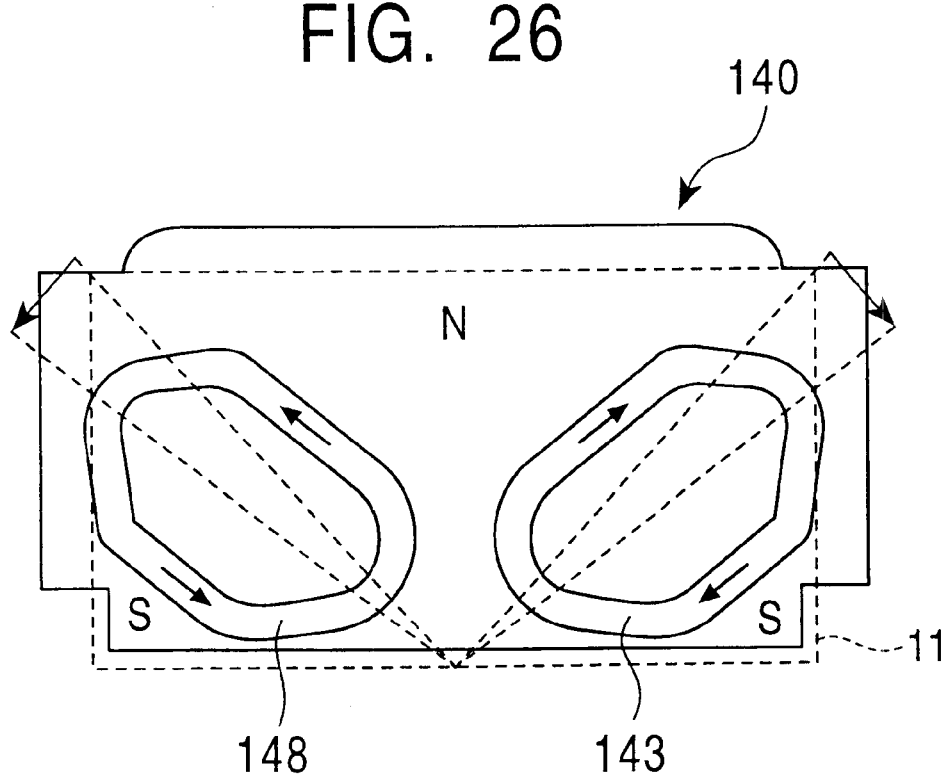
FIGS. 26 to 29 are views illustrating the relationship between the inclination of drive coils A and B, and a drive force.
Figure 27:
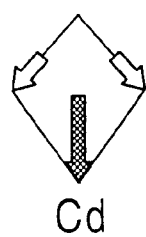
Figure 28:
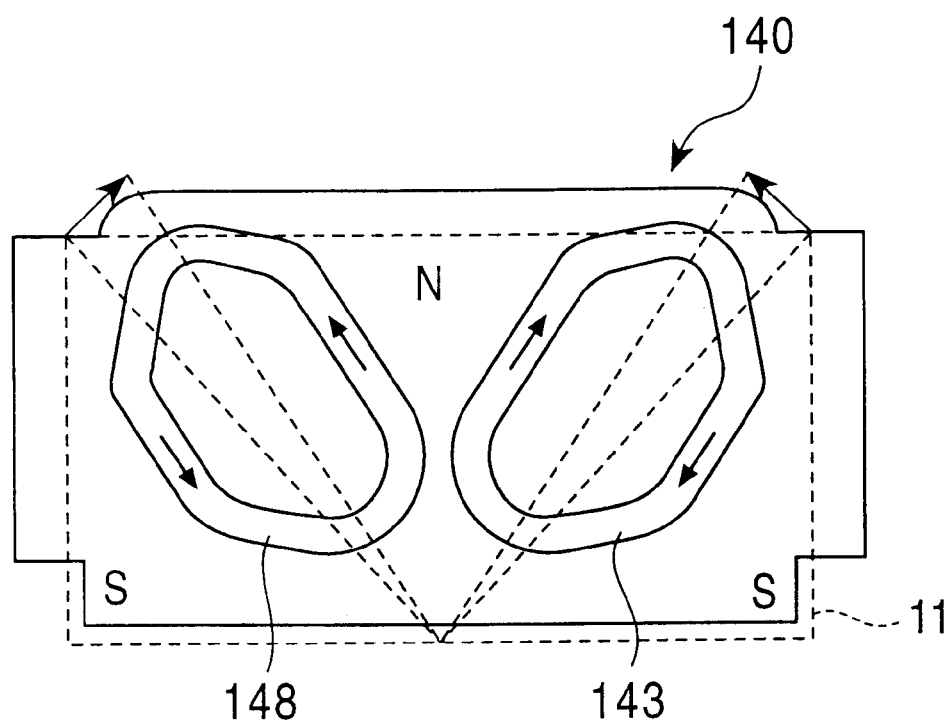
Figure 29:
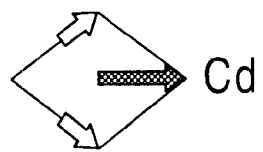

For example, FIG. 26 illustrates the drive coil A 143 and the drive coil B 148 that are inclined at an angle of 45 degrees or more relative to the optical axis, providing greater drive forces than at 45 degrees in the direction of focus (shown in FIG. 27). FIG. 28 illustrates the drive coil A 143 and the drive coil B 148 that are inclined at an angle of 45 degrees or more relative to the optical axis, also providing greater drive forces than at 45 degrees in the direction of tracking (shown in FIG. 29). Thus, the angle of inclination of the drive coils A 143 and B 148 affects the drive force in the direction of focus and tracking, and therefore the optimum angle of inclination is to be determined in consideration of focus and tracking drive current and the like.

Furthermore, the V-shaped magnet 11 or the inverted V-shaped magnet 12 for use in the lens driving apparatus 150' of the present invention may be formed of a three-way split multi-pole magnet shown in FIGS. 11A and 11B.

When such a V-shaped magnet 15 is used, the connection of the drive coil A 143 and the drive coil B 148 is modified to change the direction of a current flowing through the drive coil A 143 or the drive coil B 148. This makes it possible to provide the same drive force in the direction of focus and tracking as in the case described in conjunction with FIGS. 20A, 2B, 21A, and 21B.

Figure 30A:
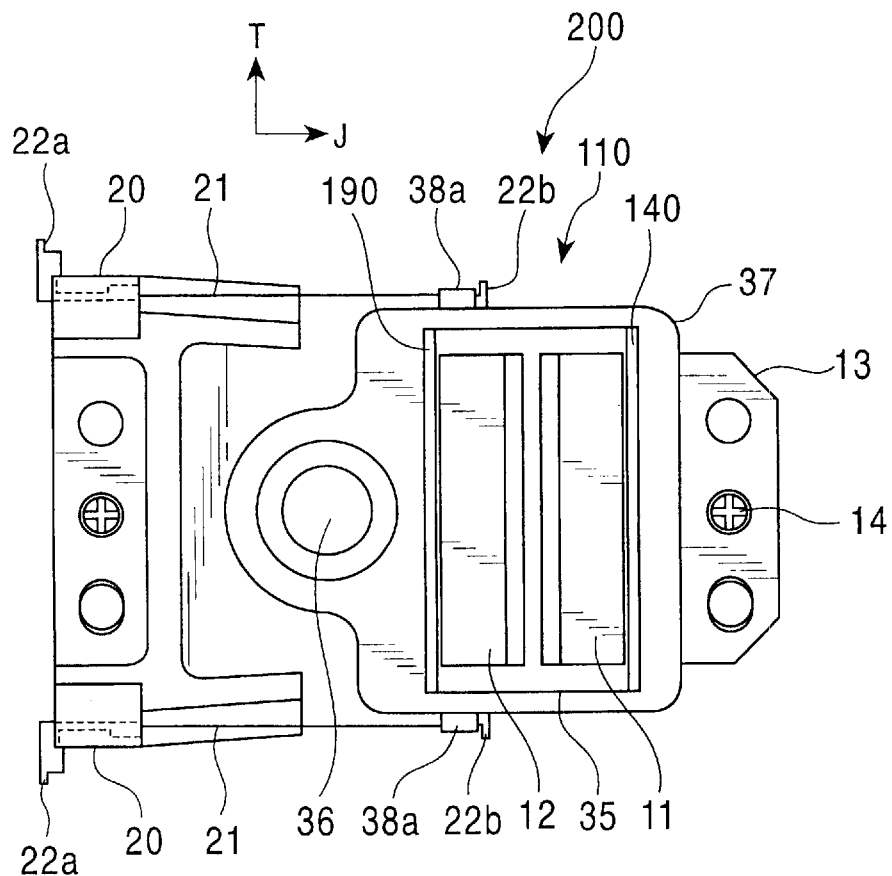
FIGS. 30A and 30B are plan and elevation views illustrating the outer appearance of a main portion of a lens driving apparatus according to a sixth embodiment of the present invention.
Figure 30B:
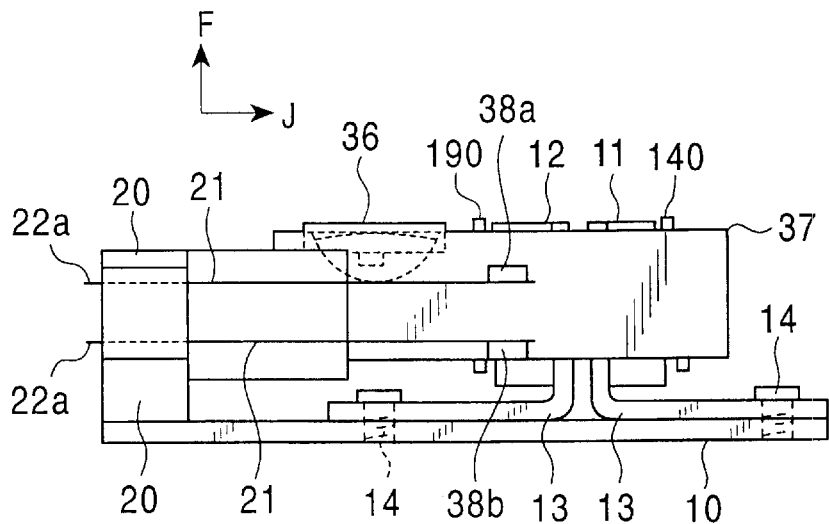

Next, FIGS. 30A and 30B illustrate the configuration of a lens driving apparatus 200' according to a sixth embodiment of the present invention. Incidentally, FIG. 30A is a top view illustrating the lens driving apparatus 200', while FIG. 30B is a side view illustrating the lens driving apparatus 200'.

The lens driving apparatus 200' according to the sixth embodiment of the present invention has the same configuration as that of the second embodiment shown in FIGS. 12A and 12B, with only the coils 80, 90 being replaced by the V-shaped drive coil 140 and the inverted V-shaped drive coil 190.

Incidentally, the lens driving apparatus ' according to the sixth embodiment operates in the same manner as the lens driving apparatus 150' according to the fifth embodiment, and thus is not explained in detail.

Figure 31A:
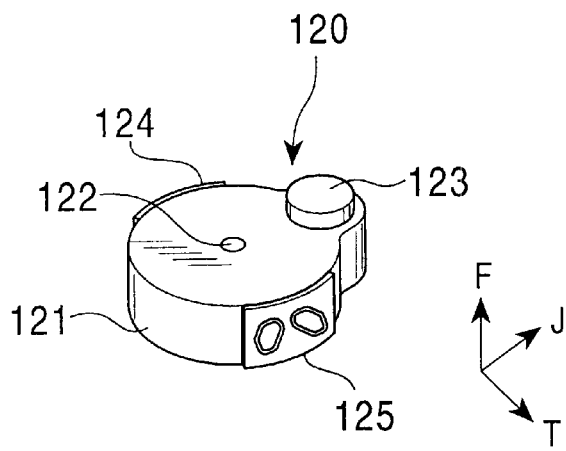
FIGS. 31A to 31C are views illustrating the outer appearance of a main portion of a lens driving apparatus according to a seventh embodiment of the present invention.
Figure 31B:
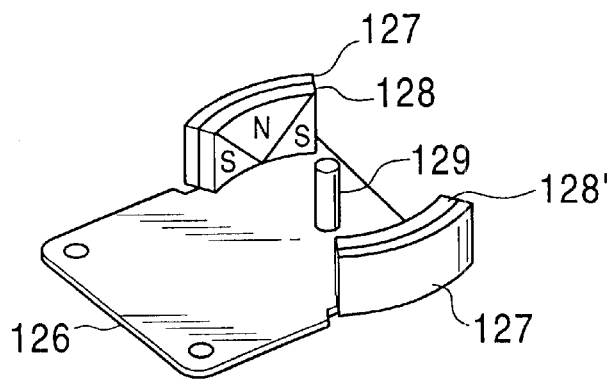
Figure 31C:
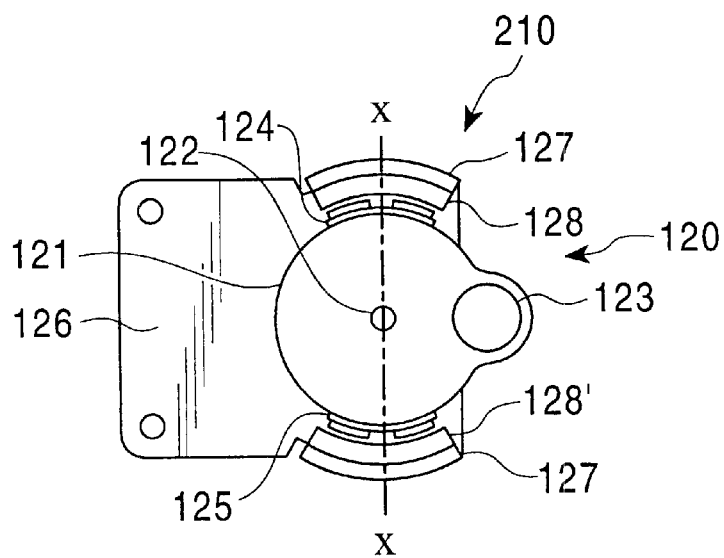

Next, the configuration of the lens driving apparatus 210' according to a seventh embodiment of the present invention is explained with reference to FIGS. 31A to 31C. Incidentally, FIG. 31A is a perspective view illustrating the movable portion 120 that constitutes the lens driving apparatus 210'. FIG. 31B is a-perspective view illustrating a yoke base 126 to which the V-shaped magnets 128, 128' that constitute the lens driving apparatus 210'. FIG. 31C is a top view illustrating the lens driving apparatus 210.

Like the lens driving apparatus illustrated in FIGS. 13A to 13C, the lens driving apparatus 210' illustrated in FIGS. 31A to 31C is referred to as the shaft sliding type, with the movable portion 120 constituting such lens driving apparatus 210' being formed in a generally cylindrical shape. The lens holder 121 of the movable portion 120 has the bearing hole 122 formed generally at the center thereof and the objective lens 123 arranged at a position offset from the bearing hole 122 toward the direction of jitter (shown by arrow J). In addition, a V-shaped drive coil 124' is fixed with adhesive or the like to one side of the lens holder 121 in the direction of tracking, while an inverted V-shaped drive coil 125' is fixed to the other side thereof in the direction of tracking. As shown in the figure, the printed board including a pair of coils is fixed thereto with the board being curved. The pair of coils is arranged in a manner such that the coil axis is oriented in the direction perpendicular to that of focus.

In addition, the actuator base 126 that constitutes the lens driving apparatus 210' has a pair of yokes 127 formed in the shape of a letter L on the right and left along the direction of tracking. The curved V-shaped magnet 128 is fixed with adhesive or the like to the inner side of one of the yokes 127 in the direction of tracking (opposite to the V-shaped drive coil 124'). On the other hand, the curved inverted V-shaped magnet 128' is fixed with adhesive or the like to the inner side of the other one of the yokes 127 in the direction of tracking (opposite to the inverted V-shaped drive coil 125'). Moreover, the support shaft 129, extending in the direction of focus, is fixed such as by press fitting or welding generally at the center between the V-shaped magnet 128 and the inverted V-shaped magnet 128'. The bearing hole 122 of the lens holder 121 is adapted to engage the support shaft 129 of the actuator base 126, whereby the movable portion 120 is supported rotatably and movably up and down.

Suppose that the lens driving apparatus 210' includes a support shaft 130 that constitutes the lens driving apparatus 210', and an X-plane is parallel to the direction of tracking as shown in FIG. 31C. In this case, a pair of plane coils that constitute the V-shaped drive coil 124' and the inverted V-shaped drive coil 125' are arranged symmetrically on the right and left with respect to the X-plane. As described in conjunction with FIGS. 20A, 2B, and 22, when a drive force is generated in the direction of focus, the movable portion 120 is slid up and down. On the other hand, when a drive force is generated in the direction of tracking, the movable portion 120 is rotated about the support shaft 129 in the clockwise or counterclockwise direction.

The lens driving apparatus 210' according to the seventh embodiment of the present invention is formed in the shaft sliding type, thereby made different in configuration from the lens driving apparatuss 150', 200' according to the fifth and sixth embodiment. Correspondingly, the lens driving apparatus 210' employs the curved V-shaped magnet 128 and inverted V-shaped magnet 128'. The lens driving apparatus 210' is also adapted to have the V-shaped drive coil 124' and the inverted V-shaped drive coil 125' curved and fixed to the sides of the lens holder 121 that is formed generally in a cylindrical shape. Therefore, the lens driving apparatus 210' operates in the same manner as the lens driving apparatuss 150', 200' according to the fifth and sixth embodiment, and is not explained any further.

As described above, the lens driving apparatus 210' according to the seventh embodiment requires less number of drive coils and provides reduced weight of the movable portion 120.

Figure 32:
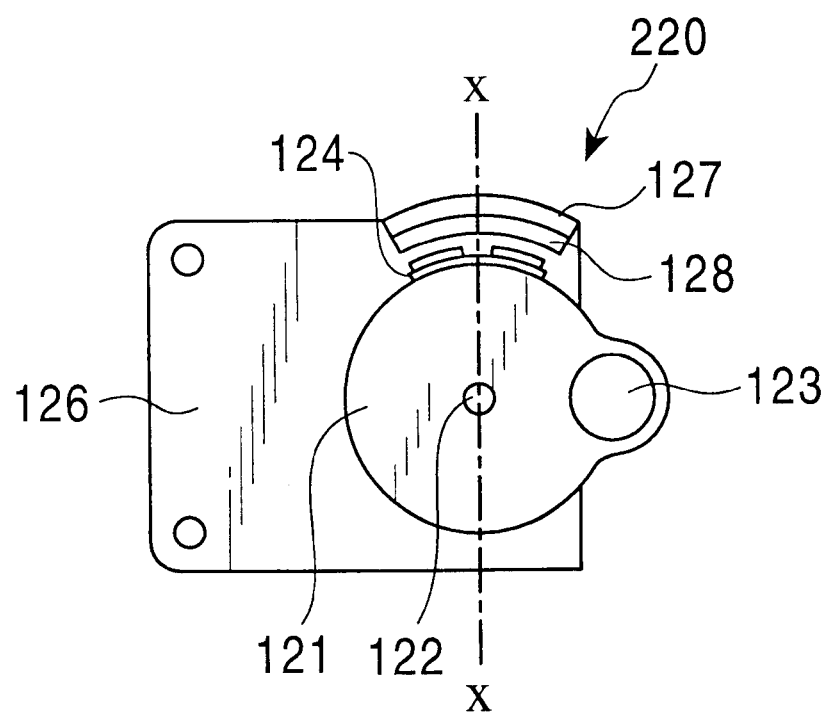
FIG. 32 is a view illustrating the outer appearance of a main portion of a lens driving apparatus according to an eighth embodiment of the present invention.

Next, as shown in FIG. 32, conceivable is a lens driving apparatus 220' according to an eighth embodiment of the present invention.

As described above, the lens driving apparatuss 150' 200' according to the fifth and sixth embodiment cause the movable portions 100, 110 to generate a rotational drive force. Therefore, the lens driving apparatuss 150', 200' are formed of the V-shaped drive coil 140 and the inverted V-shaped drive coil 190 or the V-shaped drive coil 140 rotated by 180 degrees. However, the lens driving apparatus 220' according to the seventh and eighth embodiment employs the shaft sliding type, thereby generating no rotational drive force in the movable portion 120.

As shown in FIG. 32, the lens driving apparatus 220' according to the eighth embodiment has accordingly the V-shaped drive coil 124' fixed to one side of the movable portion 120. The lens driving apparatus 220' also has the yoke 127 provided on one side of the actuator base 126 and the curved V-shaped magnet 128 arranged on the inner side thereof. That is, the lens driving apparatus 220' can be driven in the focus and tracking directions only with the V-shaped drive coil 124', thus reducing the lens driving apparatus 220' in the number of parts, in size, and in weight.

Incidentally, the embodiments of the shaft sliding type illustrated in FIGS. 31A to 31C, and 32, the pair of coils, which constitute the V-shaped drive coil 124' and the inverted V-shaped drive coil 125', are arranged symmetrically with respect to the plane X. The present invention is not limited to this particular form. Any form can be employed so long as the pair is arranged symmetrically with respect to a plane including the support shaft 129.

As described above, the lens driving apparatus according to the present invention comprises a lens holder supported movably in directions of focus and tracking. The device also comprises drive coils, mounted to the lens holder, for generating a resultant drive force obtained by adding drive forces in the directions of focus and tracking, and magnetic flux imparting means for imparting a magnetic flux to the drive coils. The drive coils each comprise a pair of coils formed symmetrically with respect to a plane perpendicular to a direction of tracking. The magnetic flux imparting means impart magnetic fluxes, opposite to each other along the direction of jitter, to two areas of each of the coils divided by imaginary lines inclined relative to the directions of both focus and tracking. One of the pair of coils is to be supplied with an additive current of a focus and tracking drive current, while the other is to be supplied with a differential current of a focus and tracking drive current. This makes it possible to provide reduced number of coils when compared with prior art devices, thereby allowing the device to be implemented with lower cost and reduced in size.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A lens driving apparatus comprising a lens holder supported movably in directions of focus and tracking, focus drive coils and tracking drive coils, mounted to said lens holder, and a magnetic flux imparting component for imparting a magnetic flux to said focus drive coils and tracking drive coils, wherein said focus drive coils and tracking drive coils respectively include a pair of plane coils formed in a plane perpendicular to a direction of jitter and each having a coil axis parallel to the direction of jitter substantially perpendicular to said directions of focus and tracking, said magnetic flux imparting component imparts magnetic fluxes in directions opposite to each other along said direction of jitter to two areas of said plane coils divided by each of boundary lines between magnetic poles which are inclined relative to said directions of both focus and tracking, and said boundary lines are arranged symmetrically with respect to a plane parallel to the direction of jitter and including an optical axis, and wherein one of said pair of plane coils constituting said focus drive coils and a corresponding one of said pair of plane coils constituting said tracking drive coils are arranged one on the other along said direction of jitter.

2. The lens driving apparatus according to claim 1, wherein
said magnetic flux imparting means include magnets opposite to said plane coils, said magnets having different magnetic poles opposite to each of said two areas.

3. The lens driving apparatus according to claim 1, wherein
said magnetic flux imparting component is arranged opposite to said plane coils and include magnets having magnetic pole surfaces perpendicular to said direction of jitter, and
said magnetic pole surfaces have different magnetic poles sitting on areas bounded by each of said boundary lines.

4. The lens driving apparatus according to claim 1, wherein
said pair of plane coils constituting said focus drive coils are supplied with drive currents in the same direction, whereas said pair of plane coils constituting said tracking drive coils are supplied with drive currents in directions opposite to each other.

5. The lens driving apparatus according to claim 1, wherein
said pair of plane coils constituting said focus drive coil each are supplied with drive currents in directions opposite to each other, whereas said pair of plane coils constituting said tracking drive coil each are supplied with drive currents in the same direction.

6. The lens driving apparatus according to claim 1, wherein
said one of said pair of plane coils constituting said focus drive coils and said corresponding one of said pair of plane coils constituting said tracking drive coils have the same in-plane shape.

7. The lens driving apparatus according to claim 1, wherein
said pair of plane coils constituting said focus drive coil each generate drive forces to yield a resultant focus drive force, whereas said pair of plane coils constituting said tracking drive coil each generate drive forces to yield a resultant tracking drive force.

8. The lens driving apparatus according to claim 1, wherein each of said focus drive coils and said tracking drive coils are pairs of plane coils having the same in-plane shape and are arranged on both sides of a substrate.

9. The lens driving apparatus according to claim 1, wherein each of said focus drive coils and said tracking drive coils has an asymmetric form.

10. The lens driving apparatus according to claim 1, wherein each of said focus drive coils and said tracking drive coils is arranged to cross one of said boundary lines between magnetic poles, and has a portion in parallel with said one of said boundary lines in each of said two areas.

11. A lens driving apparatus comprising
a lens holder supported movably in directions of focus and tracking,
drive coils, mounted to said lens holder, for generating a drive force in a direction of focus and a drive force in a direction of tracking to yield a resultant drive force, and
a magnetic flux imparting component for imparting a magnetic flux to said drive coils,
wherein
said drive coils each comprise a pair of coils arranged symmetrically with respect to a plane including an optical axis and perpendicular to the direction of tracking,
said magnetic flux imparting component imparts magnetic fluxes in directions opposite to each other along the direction of jitter to two areas of said coils divided by each of boundary lines between magnetic poles which are inclined relative to said directions of both focus and tracking, and
one of said pair of coils is supplied with an additive current of focus and tracking drive currents, whereas the other is supplied with a differential current of the focus and tracking drive currents,
wherein said pair of plane coils have the same in-plane shape and are arranged on both sides of a substrate.

12. The lens driving apparatus according to claim 1, wherein each of said drive coils is arranged to cross one of said boundary lines between magnetic poles, and has a portion in parallel with said one of said boundary lines in each of said two areas.

13. A lens driving apparatus comprising
a lens holder having a bearing hole to be fitted to a shaft extending in a direction of focus, made slidable along and rotatable about said shaft,
focus drive coils and tracking drive coils, mounted to said lens holder, and
a magnetic flux imparting component for imparting a magnetic flux to said focus drive coils and tracking drive coils, wherein
said focus drive coils and tracking drive coils respectively include a pair of plane coils each having a coil axis perpendicular to a direction of focus,
said magnetic flux imparting component imparts magnetic fluxes in directions opposite to each other to two areas of said coils divided by each of boundary lines between magnetic poles which is inclined relative to said directions of both focus and tracking, and
said boundary lines are arranged symmetrically with respect to a plane including said axis, and wherein said plane coils constituting said focus drive coil and said tracking drive coil are arranged one on the other along said direction of jitter.

14. The lens driving apparatus according to claim 1, wherein each of said focus drive coils has an elliptical form with a line of apsides in a direction parallel with one of said boundary lines between magnetic poles.

15. The lens driving apparatus according to claim 11, wherein said pair of coils are arranged in the same plane perpendicular to the direction of jitter.

16. The lens driving apparatus according to claim 11, wherein said pair of coils are plane coils provided on the same printed board parallel to a plane perpendicular to the direction of jitter.

17. The lens driving apparatus according to claim 11, wherein said magnetic flux imparting component includes magnetic pole surfaces opposite to said drive coils, said magnetic pole surfaces having different magnetic poles corresponding to said two areas.

18. The lens driving apparatus according to claim 11, wherein said boundary lines are inclined at about 45 degrees relative to both said directions of focus and tracking.

19. A lens driving apparatus comprising
a lens holder supported movably in directions of focus and tracking, drive coils, mounted to said lens holder, for generating a drive force in a direction of focus and a drive force in a direction of tracking to yield a resultant drive force, and a magnetic flux imparting component for imparting a magnetic flux to said drive coils, wherein said drive coils each comprise a pair of coils arranged symmetrically with respect to a plane including an optical axis and perpendicular to the direction of tracking, said magnetic flux imparting component imparts magnetic fluxes in directions opposite to each other along the direction of jitter to two areas of said coils divided by each of boundary lines between magnetic poles which are inclined relative to said directions of both focus and tracking, and one of said pair of coils is supplied with an additive current of focus and tracking drive currents, whereas the other is supplied with a differential current of the focus and tracking drive currents, wherein each of said drive coils has an asymmetric form.

20. The lens driving apparatus according to claim 19, wherein said pair of coils are arranged in the same plane perpendicular to the direction of jitter.

21. The lens driving apparatus according to claim 19, wherein said pair of coils are plane coils provided on the same printed board parallel to a plane perpendicular to the direction of jitter.

22. The lens driving apparatus according to claim 19, wherein said magnetic flux imparting component includes magnetic pole surfaces opposite to said drive coils, said magnetic pole surfaces having different magnetic poles corresponding to said two areas.

23. The lens driving apparatus according to claim 19, wherein said boundary lines are inclined at about 45 degrees relative to both said directions of focus and tracking.

24. A lens driving apparatus comprising a lens holder supported movably in directions of focus and tracking, drive coils, mounted to said lens holder, for generating a drive force in a direction of focus and a drive force in a direction of tracking to yield a resultant drive force, and a magnetic flux imparting component for imparting a magnetic flux to said drive coils, wherein said drive coils each comprise a pair of coils arranged symmetrically with respect to a plane including an optical axis and perpendicular to the direction of tracking, said magnetic flux imparting component imparts magnetic fluxes in directions opposite to each other along the direction of jitter to two areas of said coils divided by each of boundary lines between magnetic poles which are inclined relative to said directions of both focus and tracking, and one of said pair of coils is supplied with an additive current of focus and tracking drive currents, whereas the other is supplied with a differential current of the focus and tracking drive currents, wherein each of said drive coils has an elliptical form with a line of apsides in a direction parallel with one of said boundary lines between magnetic poles.

25. The lens driving apparatus according to claim 24, wherein said pair of coils are arranged in the same plane perpendicular to the direction of jitter.

26. The lens driving apparatus according to claim 24, wherein said pair of coils are plane coils provided on the same printed board parallel to a plane perpendicular to the direction of jitter.

27. The lens driving apparatus according to claim 24, wherein said magnetic flux imparting component includes magnetic pole surfaces opposite to said drive coils, said magnetic pole surfaces having different magnetic poles corresponding to said two areas.

28. The lens driving apparatus according to claim 24, wherein said boundary lines are inclined at about 45 degrees relative to both said directions of focus and tracking.

\* \* \* \* \*